(12) United States Patent
Takahashi et al.

(10) Patent No.: US 6,181,368 B1
(45) Date of Patent: Jan. 30, 2001

(54) ELECTRONIC ENDOSCOPE

(75) Inventors: Akihiro Takahashi; Kohei Iketani; Hideo Sugimoto, all of Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 08/982,642

(22) Filed: Dec. 2, 1997

Related U.S. Application Data

(63) Continuation of application No. 08/419,410, filed on Apr. 10, 1995, now abandoned.

(30) Foreign Application Priority Data

| Apr. 14, 1994 | (JP) | 6-75564 |
| Apr. 18, 1994 | (JP) | 6-78278 |
| Apr. 18, 1994 | (JP) | 6-78279 |
| Apr. 19, 1994 | (JP) | 6-79080 |

(51) Int. Cl.[7] ............................................ H04N 9/69
(52) U.S. Cl. .................................... 348/65; 348/70
(58) Field of Search ........................... 348/65, 69, 674, 348/675, 45, 70, 71, 254; 386/34, 44, 38; 358/519, 530; H04N 9/69

(56) References Cited

U.S. PATENT DOCUMENTS

| 4,736,245 | 4/1988 | Seto et al. ............................ 358/504 |
| 4,786,968 | 11/1988 | Kutner ................................. 348/674 |
| 4,868,654 | 9/1989 | Juri et al. ............................. 348/424 |
| 4,873,582 | 10/1989 | Furuhata et al. ...................... 386/34 |
| 4,926,254 | 5/1990 | Nakatsuka et al. ................... 358/527 |
| 4,953,012 | 8/1990 | Abe ..................................... 358/540 |
| 4,977,448 | 12/1990 | Murata et al. ....................... 358/530 |
| 5,081,524 | 1/1992 | Tsuruoka et al. ...................... 348/65 |
| 5,303,071 | 4/1994 | Kakimura ............................ 348/675 |
| 5,473,372 | 12/1995 | Nobuoka et al. .................... 348/675 |
| 5,523,861 | 6/1996 | Tanaka et al. ....................... 358/475 |
| 5,550,582 | 8/1996 | Takasugi et al. ...................... 348/65 |

FOREIGN PATENT DOCUMENTS 1178235   7/1989   (JP) .

*Primary Examiner*—Huy Nguyen
(74) *Attorney, Agent, or Firm*—Greenblum & Bernstein, P.L.C.

(57) ABSTRACT

An electronic endoscope having a solid state image pickup device supplies an image signal which is converted into a digital signal and subject to a gamma correction in a gamma correcting portion in accordance with gamma correcting data stored in and read from a look-up table. The look-up table stores only data necessary for the gamma correction with respect to the image signal, so that data for the gamma correction is added to the image signal in the gamma correcting portion to output a gamma-corrected signal.

31 Claims, 37 Drawing Sheets

Original Signal

After Gamma Correction

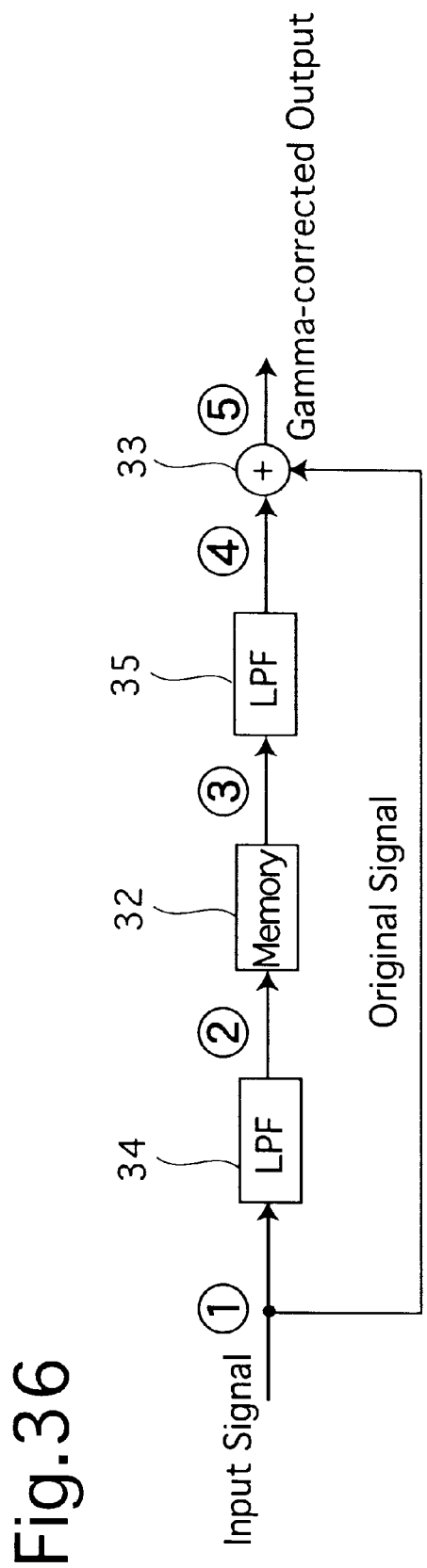

ELECTRONIC ENDOSCOPE

The present applicaion is a continuation of U.S. application Ser. No. 08/410,419 filed on Apr. 10, 1995, the disclosure of which is expressly incorporated by reference herein in its entirety. This is a continuation of U.S. application Ser. No. 08/419,410 filed on Apr. 10, 1995, abandoned, the entire contents of which are expressly incorporated by reference herein.

BACKGROUND OF THE INVENTION

1. Field of the Invention

The present invention relates to an electronic endoscope having a solid state image pickup device at a front end of an insertion portion thereof. The pickup device converts an image viewed through the endoscope into electrical signals which can be sent to an external device to reproduce the image on a monitor, etc.

2. Description of Related Art

It is necessary to carry out a gamma correction of image signals supplied from a solid state image pickup device, provided at a front end of an insertion portion of an endoscope to reproduce a clear and natural image.

To this end, in a known endoscope, an output value which has been subjected to a gamma correction, corresponding to image signals (original signals) to be input to a gamma correction portion is written in advance in a look-up table in a memory. The image signals are applied as an address signal for the memory of the look-up table to produce a corresponding gamma-corrected value. The corrected signals are then reconverted to analog signals, processed and displayed on a monitor (see for example, Japanese Unexamined Patent Publication No. 1-178235).

However, the gamma-corrected value written in the look-up table has a greater value corresponding to the magnitude of the input original signals. Consequently, the look-up table requires a large memory size for data storage. This results in a substandard memory utilization efficiency and necessitates large and expensive circuits, thereby leading to increased manufacturing costs and power consumption.

Moreover, in the gamma correcting portion, when the original signal is amplified to obtain corrected signals, a noise component is superimposed on the original signal. Consequently, the S/N (signal-to-noise ratio) of the input original signal shown in FIG. 26, deteriorates particularly in a low brightness (dark) range having a high gain, as shown in FIG. 27.

It is an object of the present invention to provide an electronic endoscope in which a gamma correction of an image signal can be effected without deteriorating the S/N.

Still further, in a nonlinear operation with reference to the look-up table, data which is not written in the look-up table, such as data 1–4 between the memory addresses 0 and 1, shown in FIG. 35, is produced.

Consequently, there are large amounts of data which are not written in the look-up table in a low brightness range (dark area) in which data varies considerably depending on the address. Accordingly, a quantization error inherent in the operation of digital data occurs during the gamma correction.

It is a further object of the present invention to provide an electronic endoscope in which a gamma correction of digital image signals can be carried out without deteriorating the S/N or increasing a quantization error.

SUMMARY OF THE INVENTION

It is an object of the present invention to provide an electronic endoscope having an increased memory utilization efficiency, wherein a look-up table for a gamma correction is a small and inexpensive memory.

To achieve the object mentioned above, according to the present invention, there is provided an electronic endoscope having a solid state image pickup device supplying an image signal, comprising; a look-up table for storing therein only data necessary for gamma correction with respect to the image signal a; gamma correcting device for adding the gamma correcting data to the image signal and outputting a gamma-correcting image signal.

According to another aspect of the present invention, there is provided an electronic endoscope having a solid state image pickup device supplying an image signal which is converted to a digital signal and is subject to a gamma correction in accordance with gamma correcting data stored in and read from a look-up table, wherein the look-up table stores therein data necessary for the gamma correction of the original signal, and wherein a low-pass filter eliminates a noise component from the original signal input to the look-up table, so that the data for the gamma correction is added to the original signal read from the look-up table to output a gamma-corrected signal.

According to a further aspect of the present invention, there is provided an electronic endoscope having a solid state image pickup device supplying an image signal which is converted to a digital signal and subject to a gamma correction in accordance with gamma correcting data stored in and read from a look-up table, wherein the look-up table stores therein data necessary for the gamma correction of the original signal input thereto, and wherein a low-pass filter removes a noise component from the signal supplied from the look-up table, so that the data for the gamma correction, read from the look-up table, is added through the low-pass filter to the original signal to output a gamma-corrected signal.

According to another aspect of the present invention, there is provided an electronic endoscope having a solid state image pickup device supplying an image signal is converted to a digital signal and subject to a gamma correction in accordance with gamma correcting data stored in and read from a look-up table, wherein the look-up table stores therein data necessary for the gamma correction of the original signal input thereto, and wherein a first low-pass filter removes a noise component from the signal supplied to the look-up table, and a second low-pass filter removes a noise component from the signal issued from to the look-up table, so that the data for the gamma correction, read from the look-up table and transmitted through the second low-pass filter, is added to the original signal to output a gamma-corrected signal.

The present disclosure relates to subject matter contained in Japanese patent application Nos. 06-75564 (filed on Apr. 14, 1994), 06-78278 (filed on Apr. 18, 1994), 06-78279 (filed on Apr. 18, 1994), and 06-79080 (filed on Apr. 19, 1994) which are expressly incorporated herein by reference in their entireties.

BRIEF DESCRIPTION OF THE DRAWINGS

The invention will be described below in detail with reference to the accompanying drawings, in which;

FIG. 36 is a conceptual diagram of a gamma correcting circuit according to an embodiment of the present invention;

DESCRIPTION OF THE PREFERRED EMBODIMENT

Figure 2:
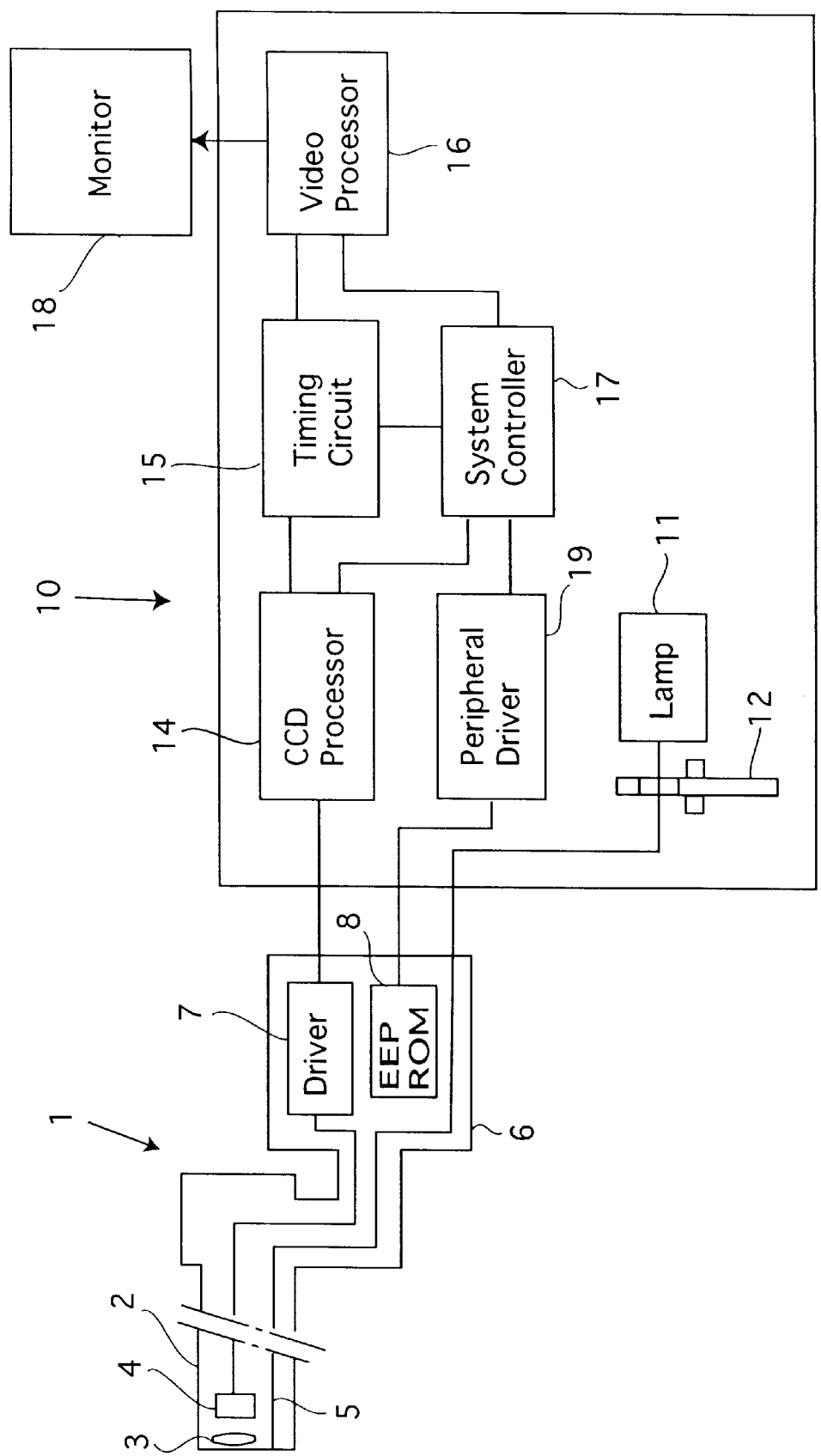
FIG. 2 is a block diagram of the entire structure of an electronic endoscope according to a first embodiment of the present invention.

FIG. 2 shows an entire system of an electronic endoscope according to the present invention. The endoscope 1 has an insertion portion 2 provided on the front end thereof with an objective optical system 3. A solid state image pickup device 4 which is comprised of, for example, a charge-coupled device (CCD), is provided at an image forming position of the objective optical system 3 where an object image is formed. Illuminating light for illuminating a viewing area transmits through a bundle of light guide fibers (fiber bundle) 5.

The endoscope 1 also includes a connector 6 connected to a video processor 10. The connector 6 is provided with a drive circuit 7, which amplifies the signals supplied from or into the solid state image pickup device 4, and a memory (EEPROM) 8 in which inherent data for the endoscope 1 is stored and can be rewritten.

The video processor 10 also serves as an illuminating light source. Namely, illuminating light is incident upon the light guide fiber bundle 5 from a lamp (light source) 11. In the incident light path, there is provided a rotating tricolor filter 12 having a red filter (R), a green filter (G) and a blue filter (B). The tricolor filter 12 rotates at a constant speed, so that red, green and blue illuminating lights are successively incident upon the fiber bundle 5.

An output terminal of a CCD processor 14 connected to the drive circuit 7 of the solid state image pickup device 4 is connected to an input terminal of a video processor 16 through a timing circuit 15. The output signals from the video processor 16 are sent to a monitor 18.

The CCD processor 14, the timing circuit 15 and the video processor 16 are controlled by a system controller 17 having a central processing unit (CPU) in association with each other. Data from the endoscope is read from the EEPROM 8 through a peripheral driver 19 connected to the system controller 17.

Figure 3:
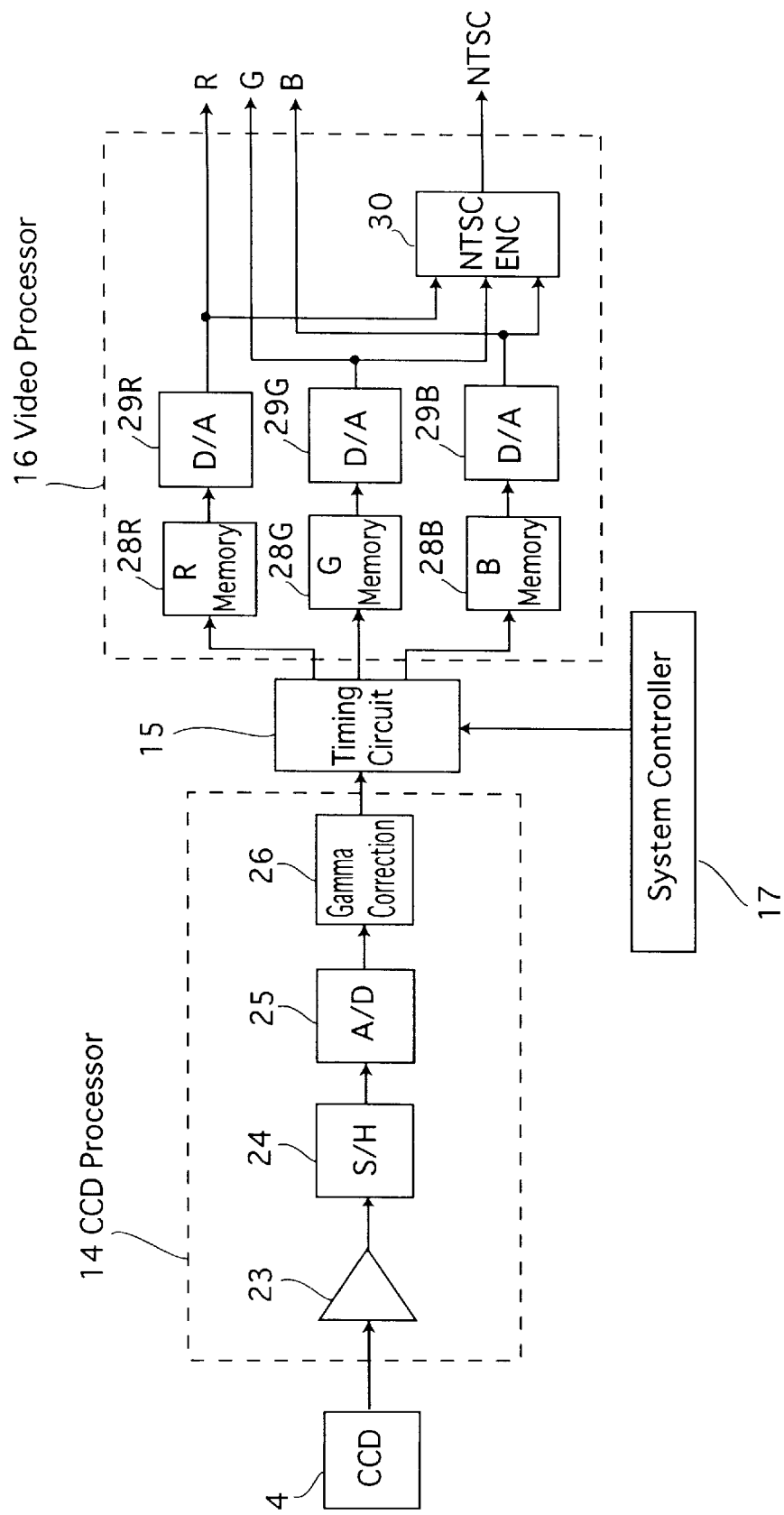
FIG. 3 is a block diagram of a circuitry according to a first embodiment of the present invention.

FIG. 3 shows the internal structure of the CCD processor 14 and the video processor 16. In the CCD processor 14, the output signal of the solid state image pickup device 4 is amplified by an amplifier 23 and sent to a sample holding circuit 24 in which image signals are extracted. The image signals are sent to an A/D converter 25 where analog image signals are converted to digital signals, which are then subject to a gamma correction in a gamma correcting circuit 26.

The gamma-corrected image signals are rearranged by the timing circuit 15 in synchronization with the driving operation of the solid state image pickup device 4, and are stored in frame memories 28R, 28G and 28B corresponding to red (R), green (G) and blue (B) colors. The image signals stored in the frame memories 28R, 28G and 28B are read simultaneously and converted to analog color signals by D/A converters 29R, 29G and 29B, respectively, The three color signals are output as three primary color signals and supplied to an NTSC encoder 30 disposed in parallel with the outputs to obtain NTSC type compound video signals to which synchronization signals are added. The compound video signals are sent to the monitor 18.

Figure 1:
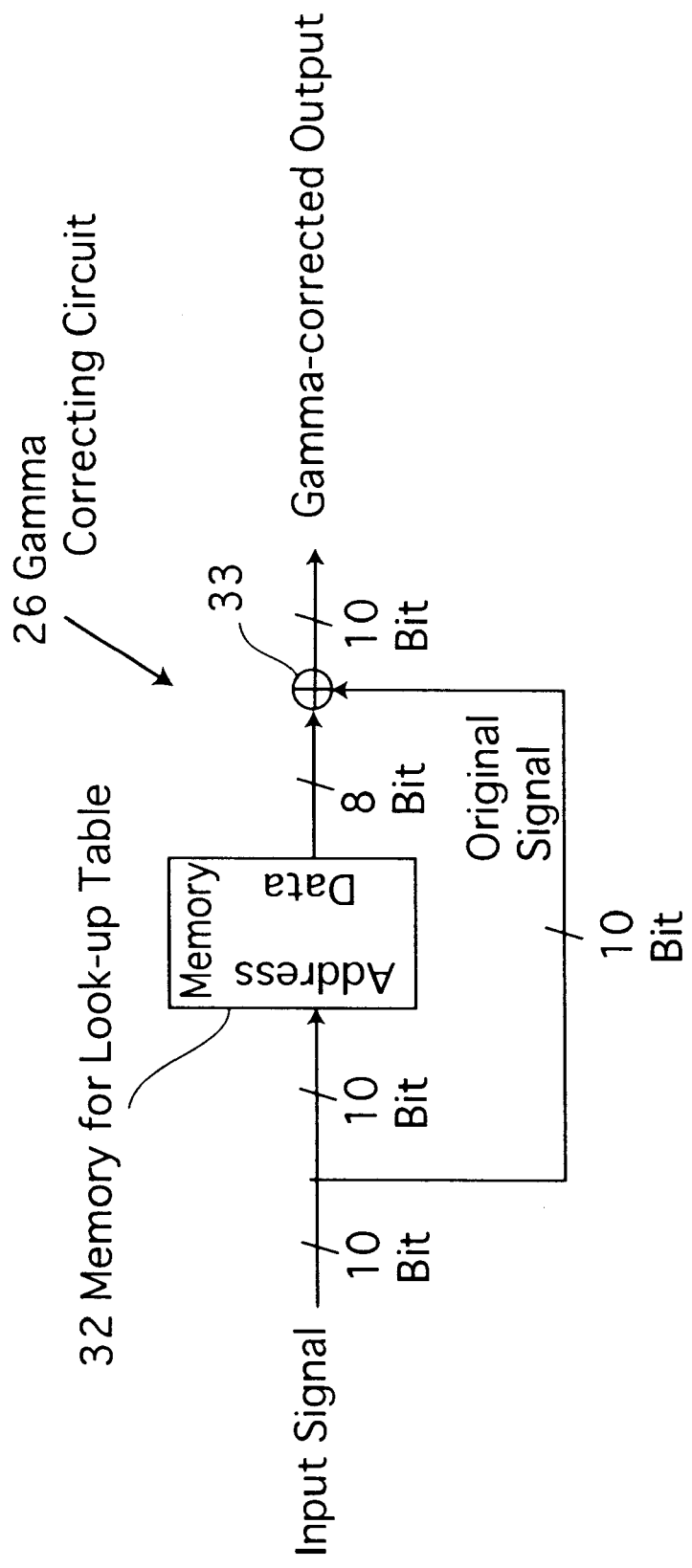
FIG. 1 is a conceptual diagram of a gamma correcting circuit according to a first embodiment of the present invention.

FIG. 1 shows an internal structure of the gamma correcting circuit 26 which is comprised of a ROM (read only memory) 28 for the look-up table and an adder 33.

Figure 4:
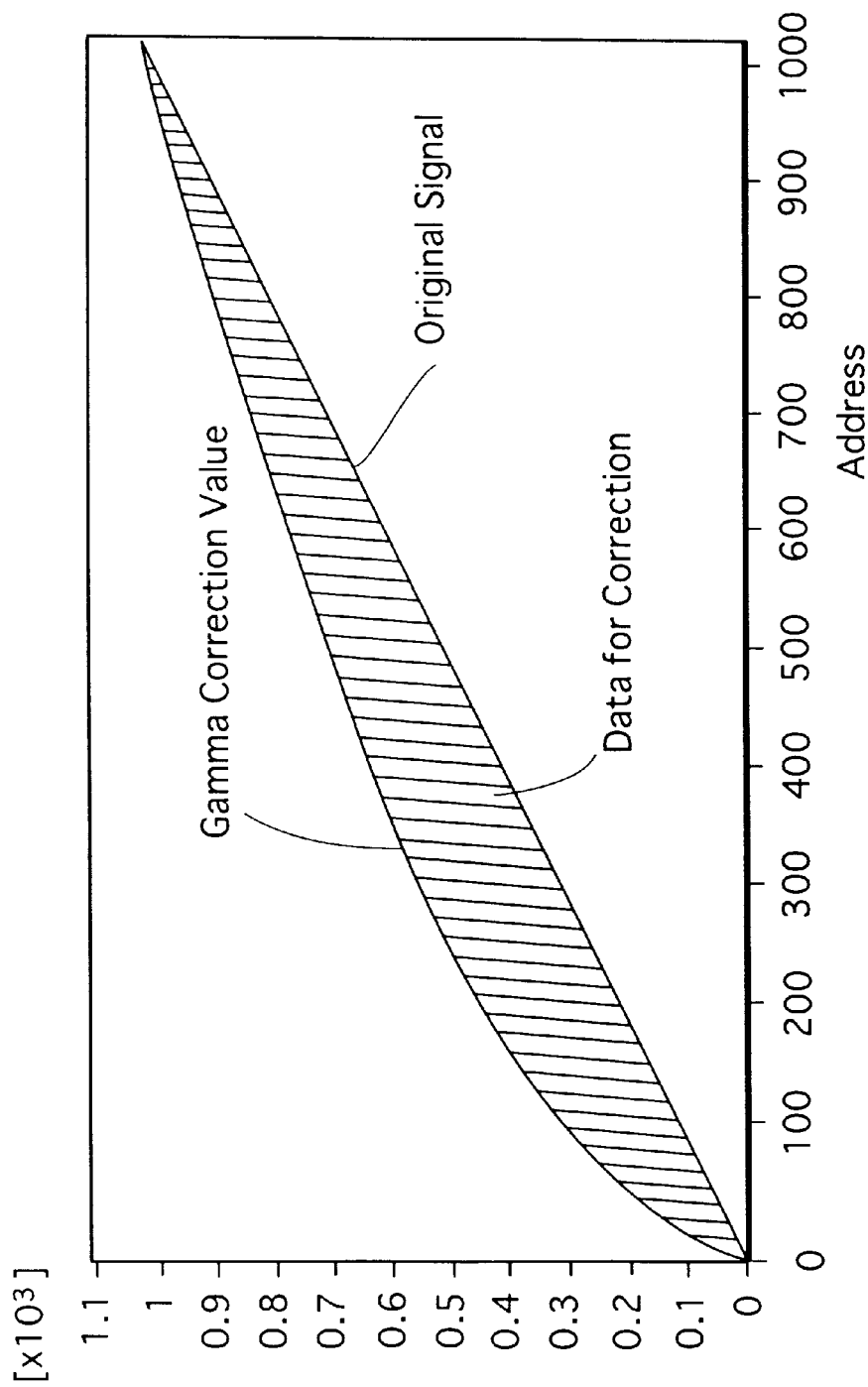
FIGS. 4 and 5 are explanatory graphs of gamma correcting data, according to a first embodiment of the present invention.
Figure 5:
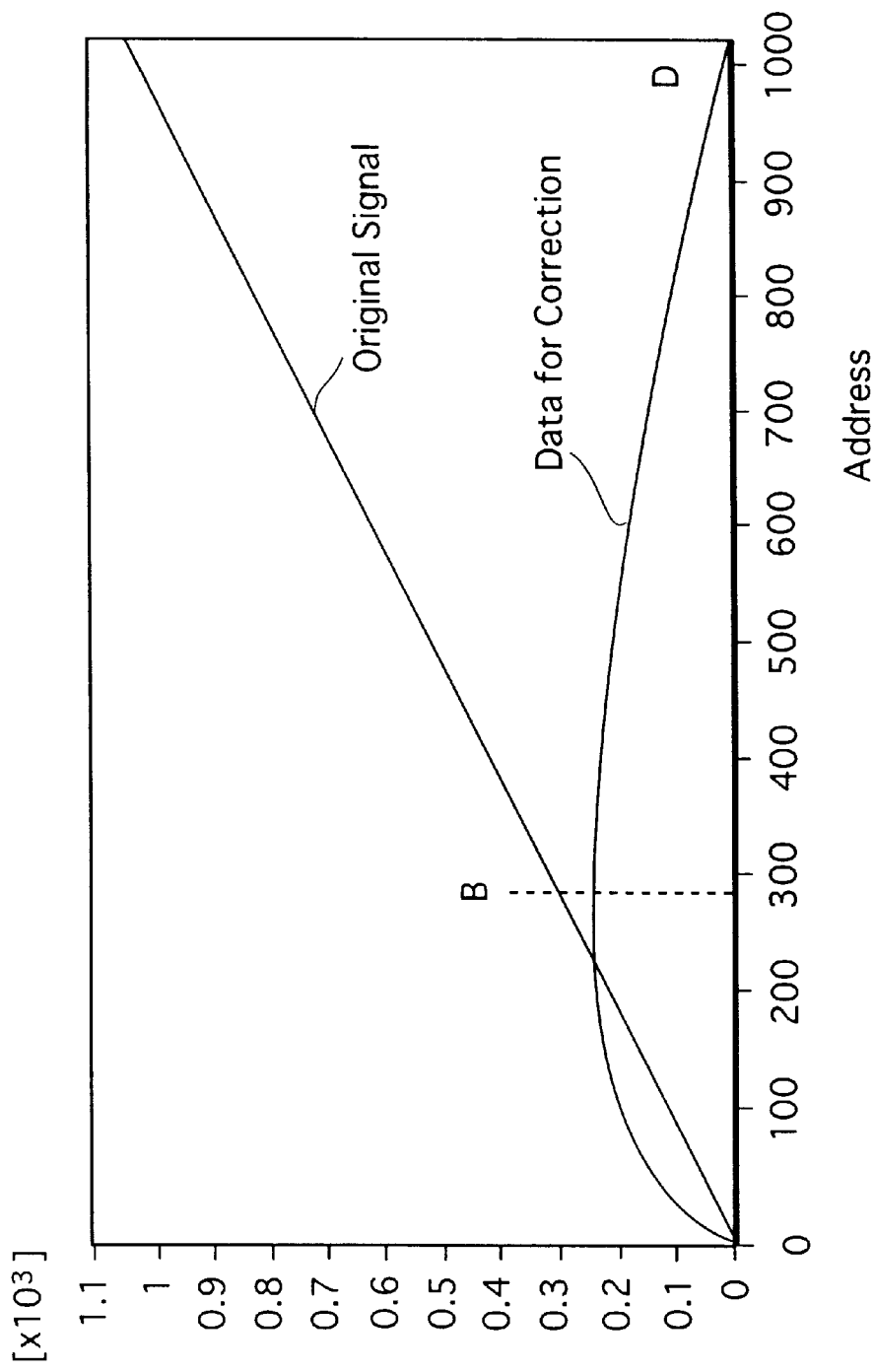

FIGS. 4 and 5 show line graphs of data stored in the memory 32 for the look-up table, by way of example. As seen in FIG. 4, the gamma-corrected values supplied to the timing circuit 15 are greater than the original input signal. However, the correction data, indicated by the gamma hatched area, is considerably smaller than the gamma-corrected values.

In the present invention, only the data for gamma correction, as shown in FIG. 5, is stored written in the memory 32 for the look-up table. The original signals are applied as an address signal for the look-up table, so that the correction data corresponding to the address signal is read from the memory 32. Consequently, the correction data is added to the original signals in the adder 33 to obtain a gamma-corrected value.

Thus, as can be seen in FIG. 1, the gamma correcting data (data for gamma correction) is about one fourth of the full scale data, and accordingly, the memory 32 for the look-up table requires a capacity which is 2 bits smaller than the original signals for storing the gamma correcting data. Note that the output signal of the adder 33 is a 10-bit signal which is the same as the original signal.

Figure 6:
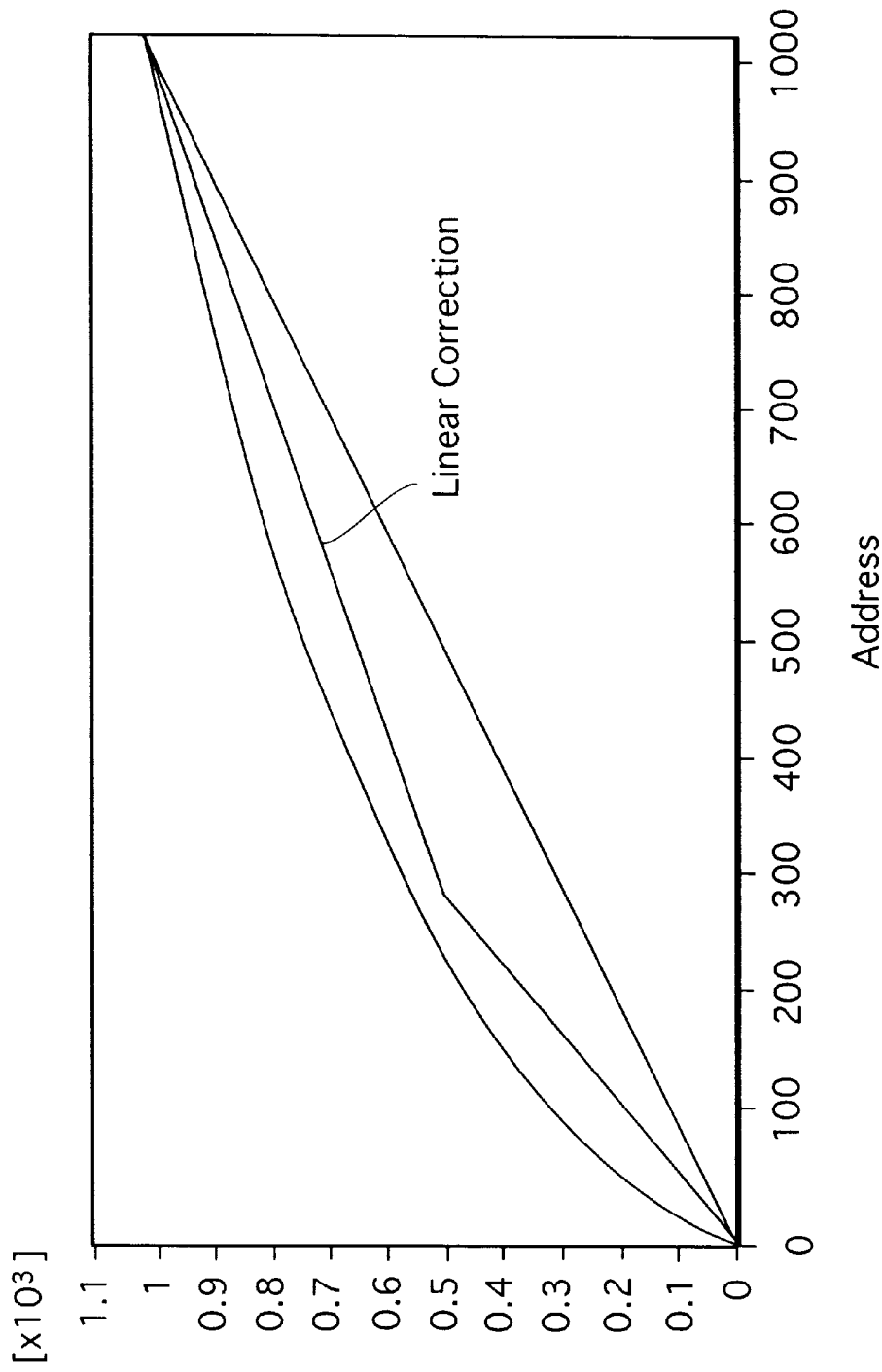
FIGS. 6 and 7 are explanatory graphs of linearly corrected gamma correction data, according to a first embodiment of the present invention.
Figure 7:
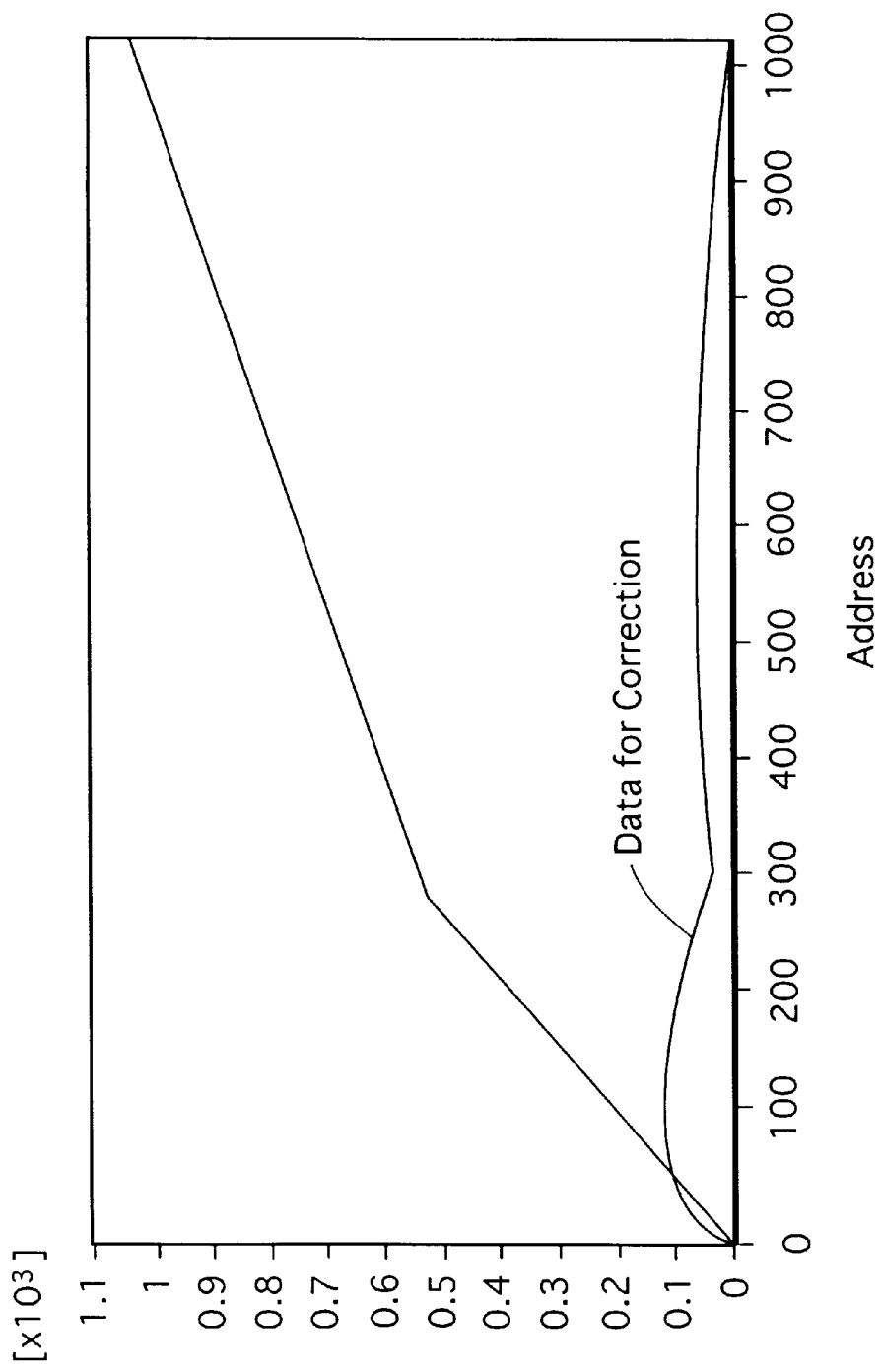

If a reference voltage is applied to a linear correction terminal of the A/D converter 25 to carry out linear gamma correction, shown in FIG. 6, the data for the gamma correction is further reduced as shown in FIG. 7. This enhances the memory utilization efficiency.

Figure 8:
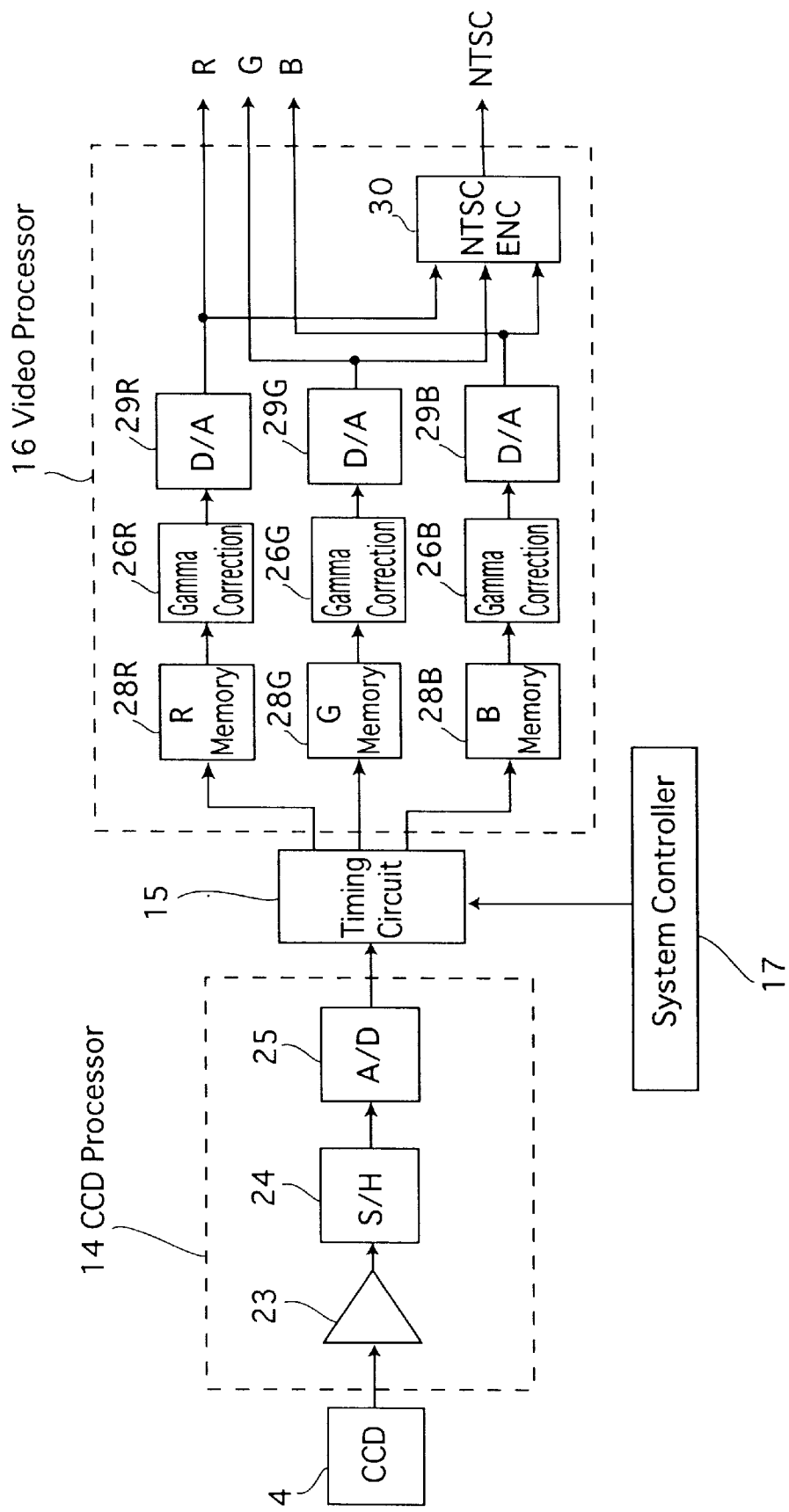
FIG. 8 is a block diagram of a circuitry according to a second embodiment of the present invention.

In a second embodiment, it is possible to connect the gamma correcting circuits 26R, 26G and 26B to the output terminals of an color frame memories 28R, 28G and 28B to carry out the independent gamma correction for each color signal, as shown in FIG. 8. In this alternative second embodiment, the structure and the operation of the gamma correcting circuits 26R, 26G and 26B are the same as those in the first embodiment mentioned above.

FIGS. 9 through 17 show a third embodiment of the present invention. In the third embodiment, various kinds of gamma correction data are written in one memory and are selectively used. The selected gamma correcting data are indicated as discussed below.

The gamma correction data to be written in the memory 32 is for gamma correction as in the first embodiment. Although two kinds of gamma correcting data are stored in one memory in the third embodiment, it is possible to store three or more kinds of gamma correcting data in the memory 32.

Figure 9:
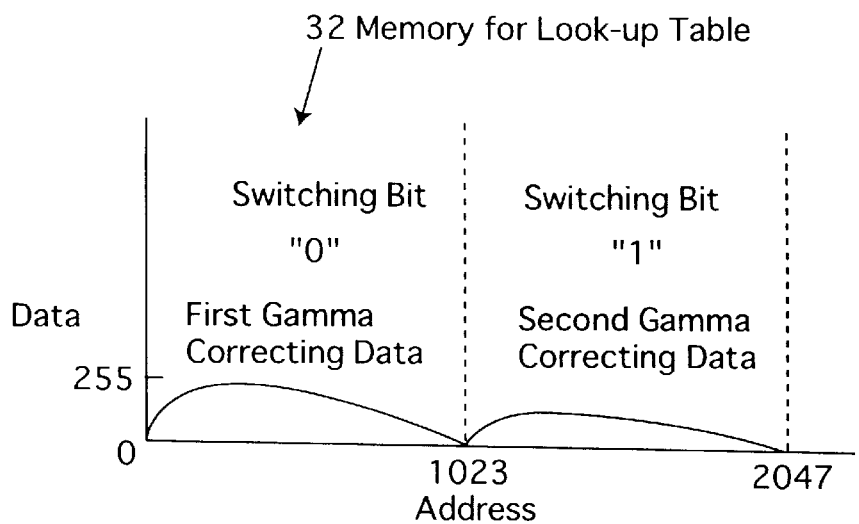
FIG. 9 is an explanatory view of a memory for a look-up table, according to a third embodiment of the present invention.

FIG. 9 shows the contents of the memory 32 for the look-up table. The memory has a larger address bit number than the number of data bits, so that the access number of address bits is used as switching bits. For example, first gamma correcting data is stored in the look-up table having addresses 0 to 1023, and second gamma correcting data is stored in the look-up table having addresses 1024 to 2047.

If the switching bit of the memory 32 is "0", the addresses 0 to 1023 are accessed, and if the switching bit is "1", addresses 1024 to 2047 are accessed. Various types of data can be selected by increasing the memory size and the number of the switching bits.

Figure 10:
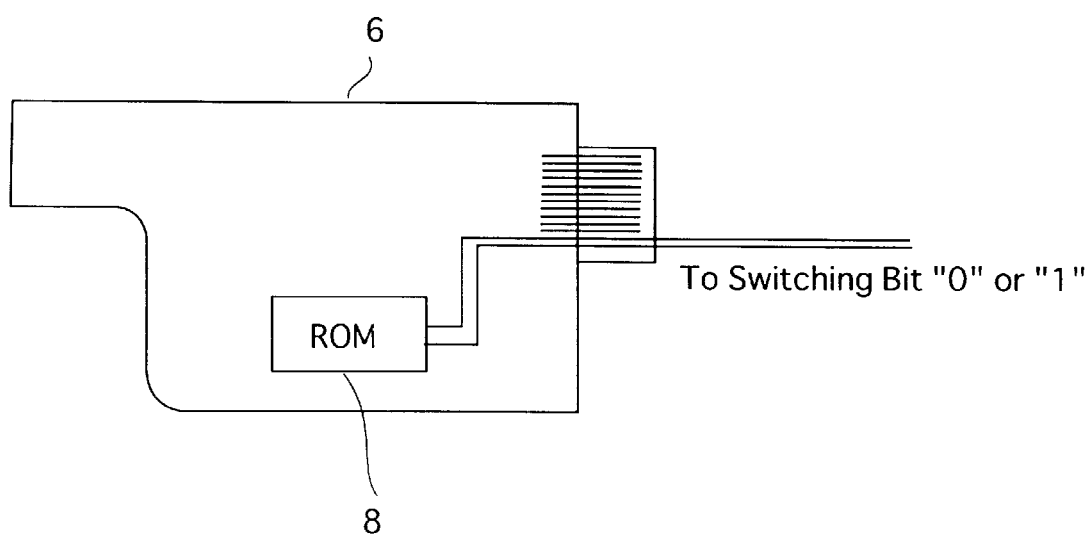
FIG. 10 is a schematic view of a connector in the third embodiment of the present invention.
Figure 11:
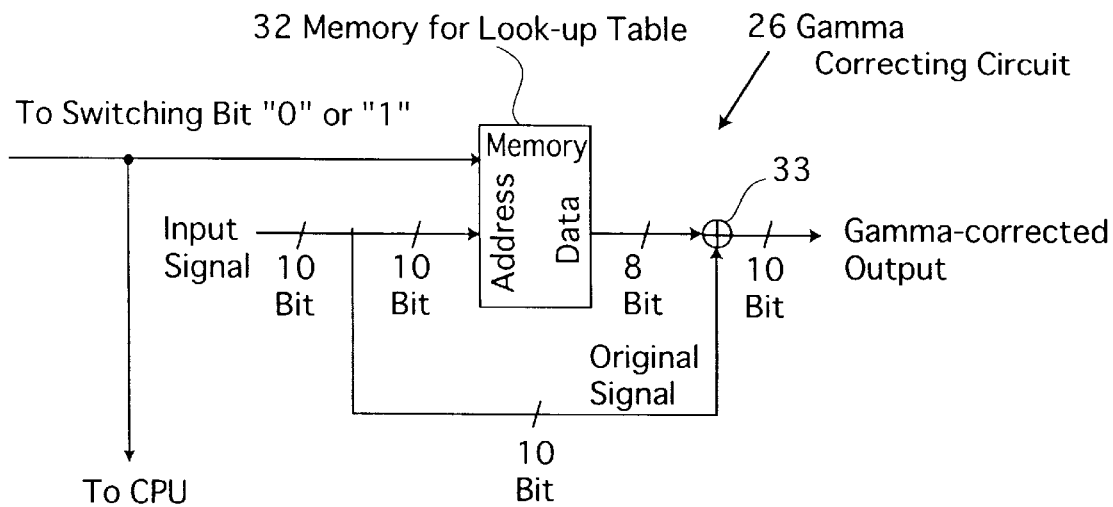
FIG. 11 is a conceptual diagram of a gamma correcting circuit according to a third embodiment of the present invention.

FIG. 10 shows a connector 6 of the endoscope, in which the signal "0" or "1" is written in the EEPROM 8 (FIG. 2), in accordance with the characteristics of a particular endoscope to be used. If the connector 6 is attached to the video processor 10, the signal "0" or "1" is supplied to the switching bit of the memory 32 in which the first or second gamma correction data is selected in accordance with the input signal, as shown in FIG. 11.

Figure 12:
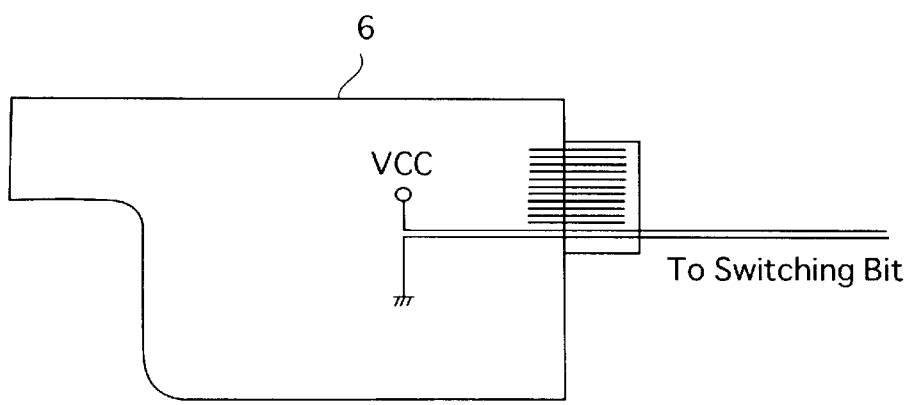
FIGS. 12 and 13 are schematic views of modified connectors in the third embodiment of the present invention.

It is possible to produce the signal "0" or "1", determined in accordance with the voltage set in the endoscope in order to supply the signal "0" or "1" to the memory 32 for the look-up table, depending on the characteristics of the associated endoscope, as shown in FIG. 12.

Figure 13:
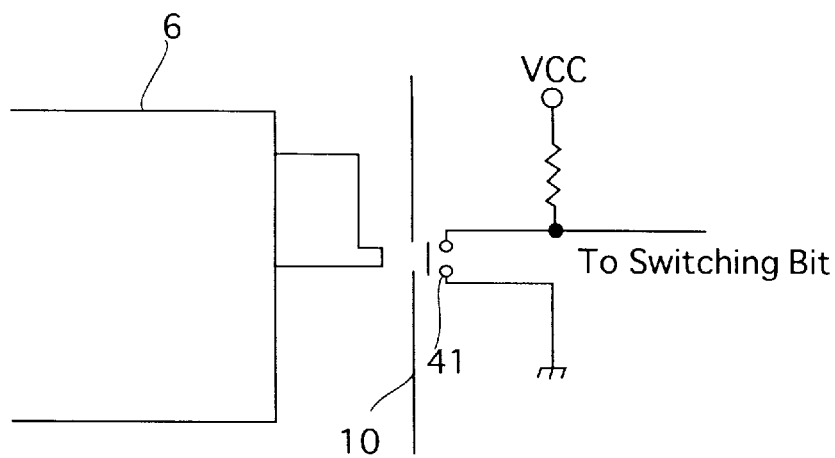

Alternatively, it is also possible to produce the signal "0" or "1" by turning on or off a switch 41 within the video processor 10 using a projection or recess formed on the connector 6, as shown in FIG. 13.

Figure 14:
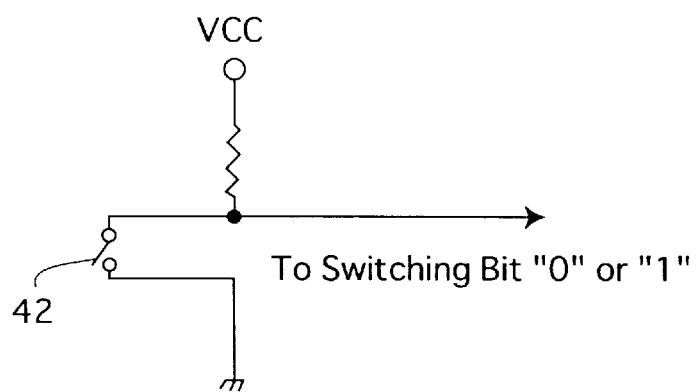
FIG. 14 is a schematic view of a selection switch in the third embodiment of the present invention.

Moreover, it is possible to provide a manual switch 42 on the endoscope 1 or the video processor 10, so that an operator can optionally select the signal "0" or "1" in accordance with the state of a subject to be examined, as shown in FIG. 14.

Figure 15:
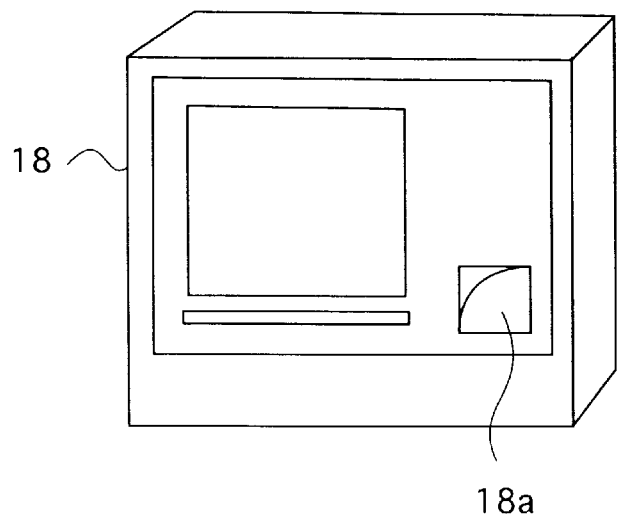
FIG. 15 is a perspective view of a monitor display in the third embodiment of the present invention.
Figure 16:
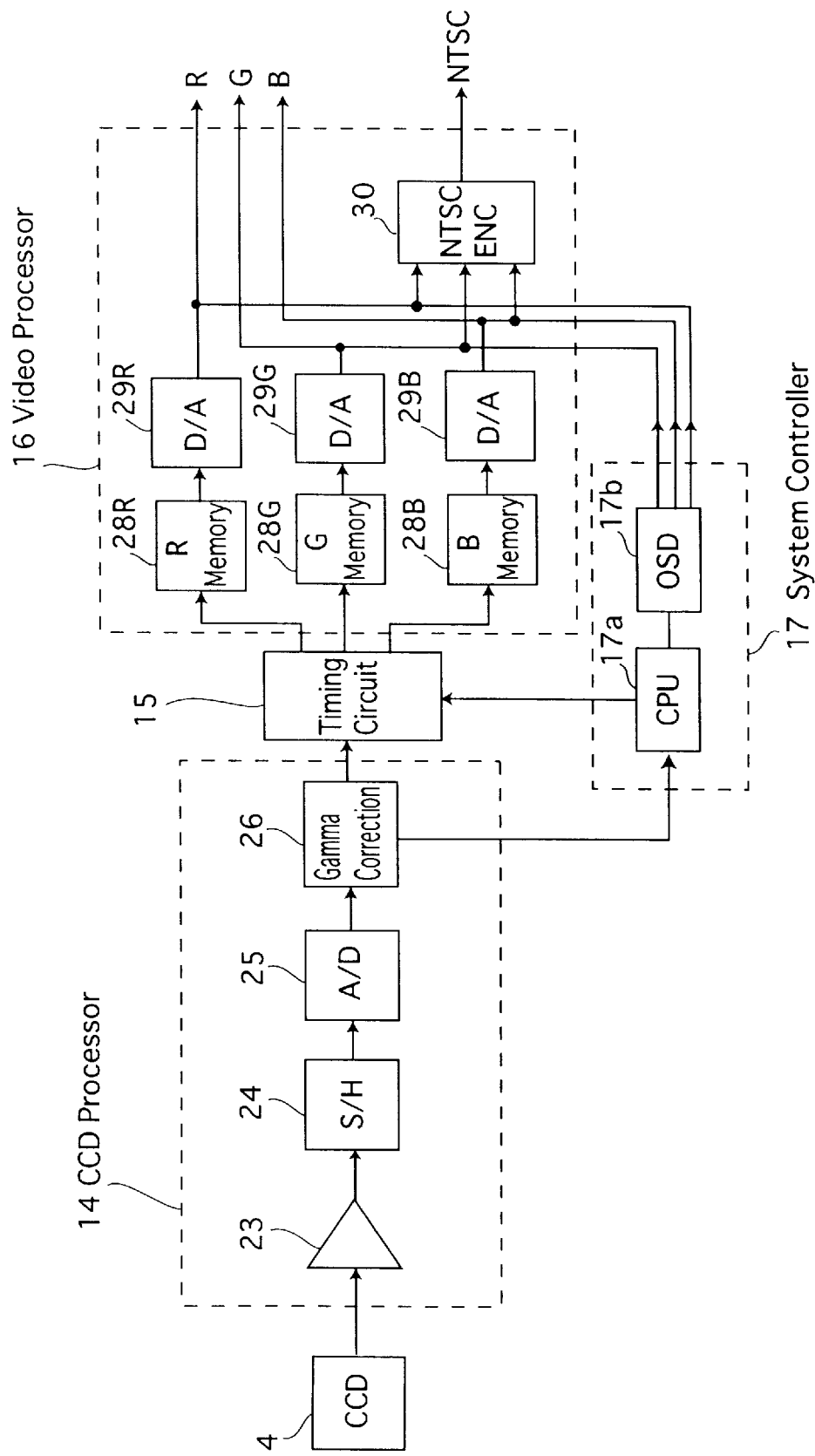
FIG. 16 is a block diagram of a circuitry according to a third embodiment of the present invention.
Figure 17:
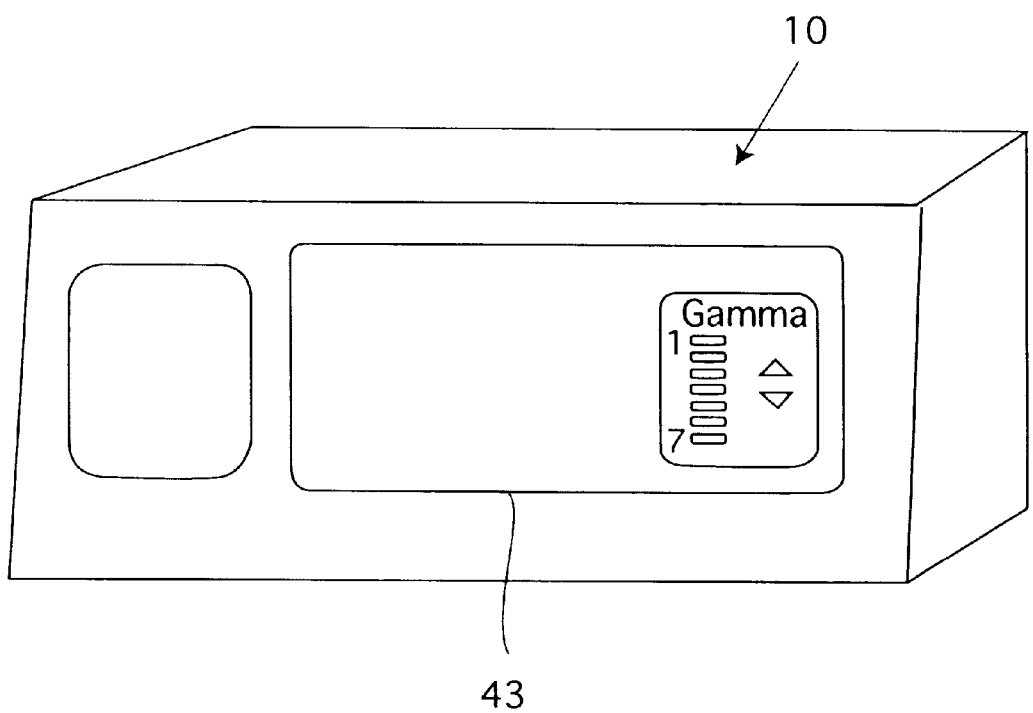
FIG. 17 shows a perspective view of an operation panel in a third embodiment of the present invention.

FIG. 15 shows a display of a monitor 18 in which the selected gamma correcting data is shown by an indicator 18a at the lower right corner of the display. The indication can be effected by inputting the separate signal "0" or "1" which is adapted to select the gamma correcting data, as shown in FIG. 11, into the CPU 17a of the system controller 17 (FIG. 16) which processes the characters of the signal on the OSD (On Screen Display) 17b. The processed signals are added to the tricolor image signal and sent to the monitor 18. Alternatively, it is possible to indicate the selected gamma correcting data on the operation panel 43 of the video processor 10, etc., as shown in FIG. 17.

As can be understood from the above discussion, according to the present invention, since only the data for gamma correction with respect to the original signals are written in the look-up table for the gamma correction, the look-up table uses by a small and inexpensive memory, thus resulting in an improved memory utilization efficiency and a small circuit, and reducing manufacturing costs and power consumption.

Consequently, if various types of gamma correcting data are selectively used, they can be stored in a single memory. This leads to the realization of a small circuit and a reduced number of components. Moreover, indicating the selected gamma correcting data on a display makes it possible to easily adjust the reproduced image and ensures a reliable examination of a subject to be examined.

Another embodiment of the invention in which the gamma correction of the image signals is performed without decreasing the S/N is discussed below with reference to FIGS. 18 through 27.

Figure 18:
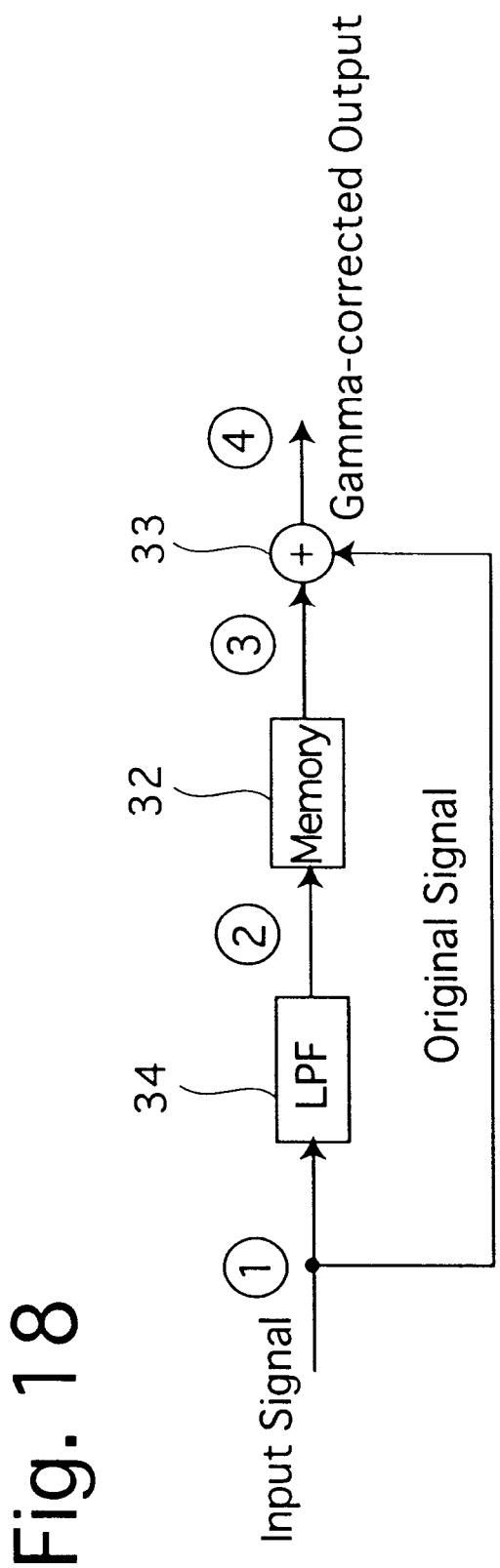
FIG. 18 is a conceptual diagram of a another embodiment of a gamma correcting circuit.

In FIG. 18 which shows another embodiment of the gamma correcting circuit 26 shown in FIG. 3, the gamma correcting circuit 26 is comprised of a ROM 32 for the look-up table, a low-pass filter 34 which removes a noise component from the original signal supplied to the memory 32 for the look-up table, and an adder 33 which adds the output signals of the memory 32 and the original signals.

The data stored in the memory 32 for the look-up table are the same as those shown in FIGS. 4 through 7.

The low-pass filter 34 is connected directly to the image signal input line before the memory 32 for the look-up table, so that the original signals sent to the adder 33 do not pass through the low-pass filter 34. Consequently, the image signals with a removed noise component are supplied to the memory 32, but the original signals are supplied to the adder 33.

Figure 19:
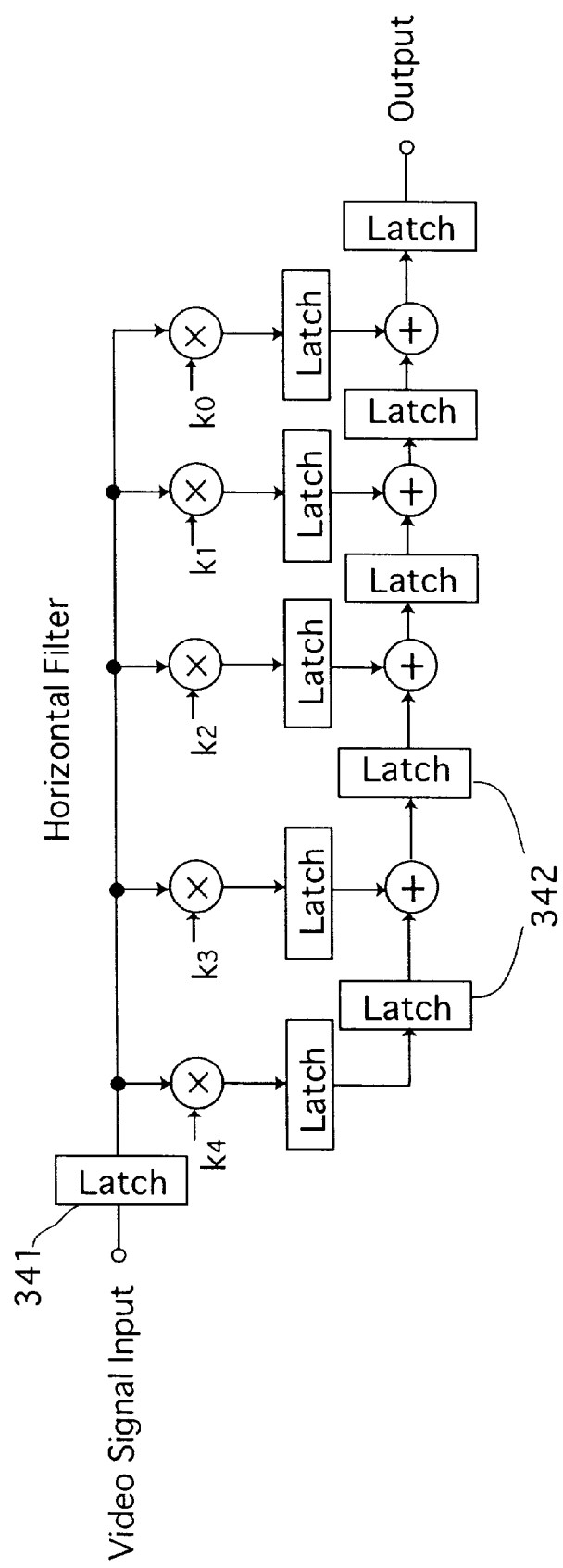
FIGS. 19, 20 and 21 are block diagrams of a circuit for a low-pass filter according to an embodiment of the present invention.
Figure 20:
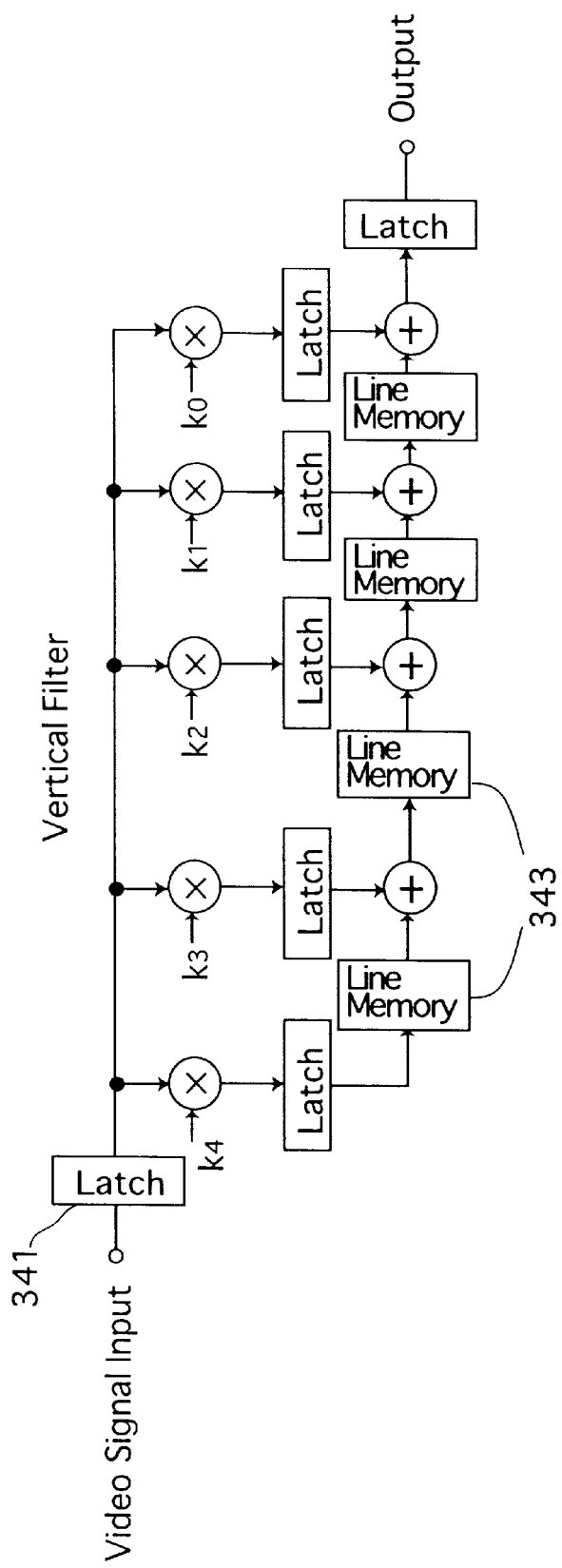
Figure 21:
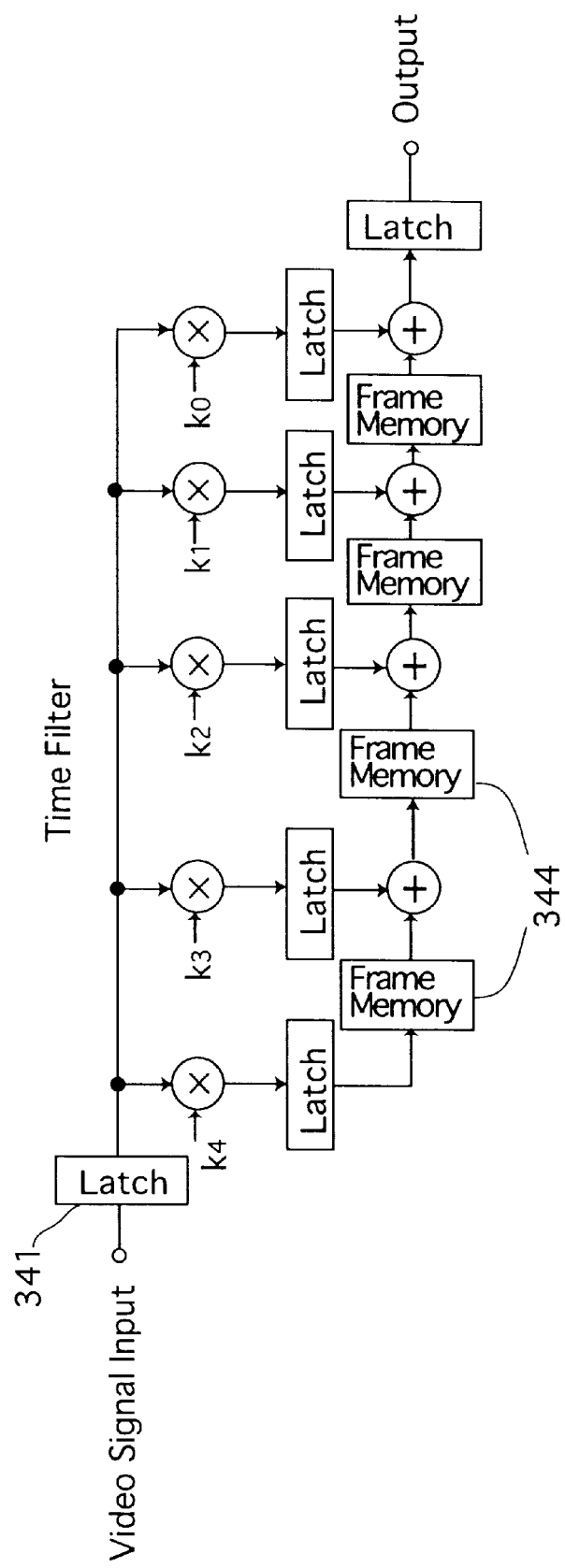

FIGS. 19 through 21 show examples of a low-pass filter circuit for removing a noise component from a digital signal. Particularly, FIGS. 19, 20 and 21 show a horizontal filter, a vertical filter, and a time filter, respectively.

In each low-pass filter shown in FIGS. 19, 20 or 21 the digital image signal input thereto is received by a latch 341 and multiplied by a plurality of predetermined constants k0 through k4 in parallel. The outputs are sent to the latches 342, and then added in the case of the horizontal filter, sent to line memories 343 and then added in the case of the vertical filter, and are received by memories 344 and added in the case of the time filter, respectively.

When an analog signal is processed in the low-pass filter, the analog output from the low-pass filter is converted to a digital signal by an A/D converter and then supplied to the memory 32 for the look-up table.

The operation of the embodiment will be discussed below in reference to FIGS. 22 and 25.

① designates the original signal prior to being input to the low-pass filter 34; ② the signal sent to the memory 32 for the look-up table through the low-pass filter 34; ③ the signal only for the gamma correction, supplied to the adder 33 through the memory 32 for the look-up table; and ④ the gamma-corrected value output from the adder 33, respectively.

Figure 22:
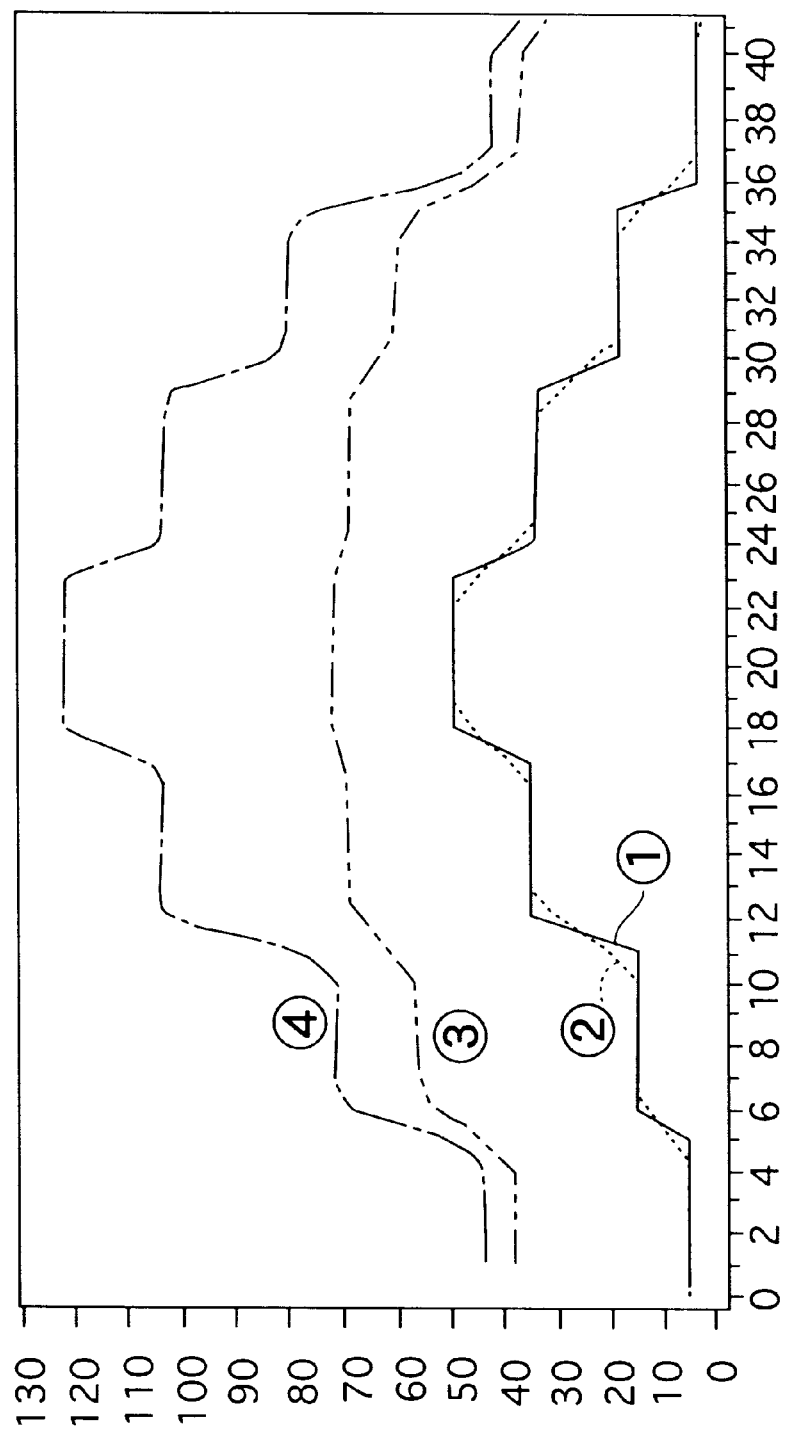
FIG. 22 is a diagram showing a change in a signal level in a low brightness (dark) area according to an embodiment of the present invention.
Figure 23:
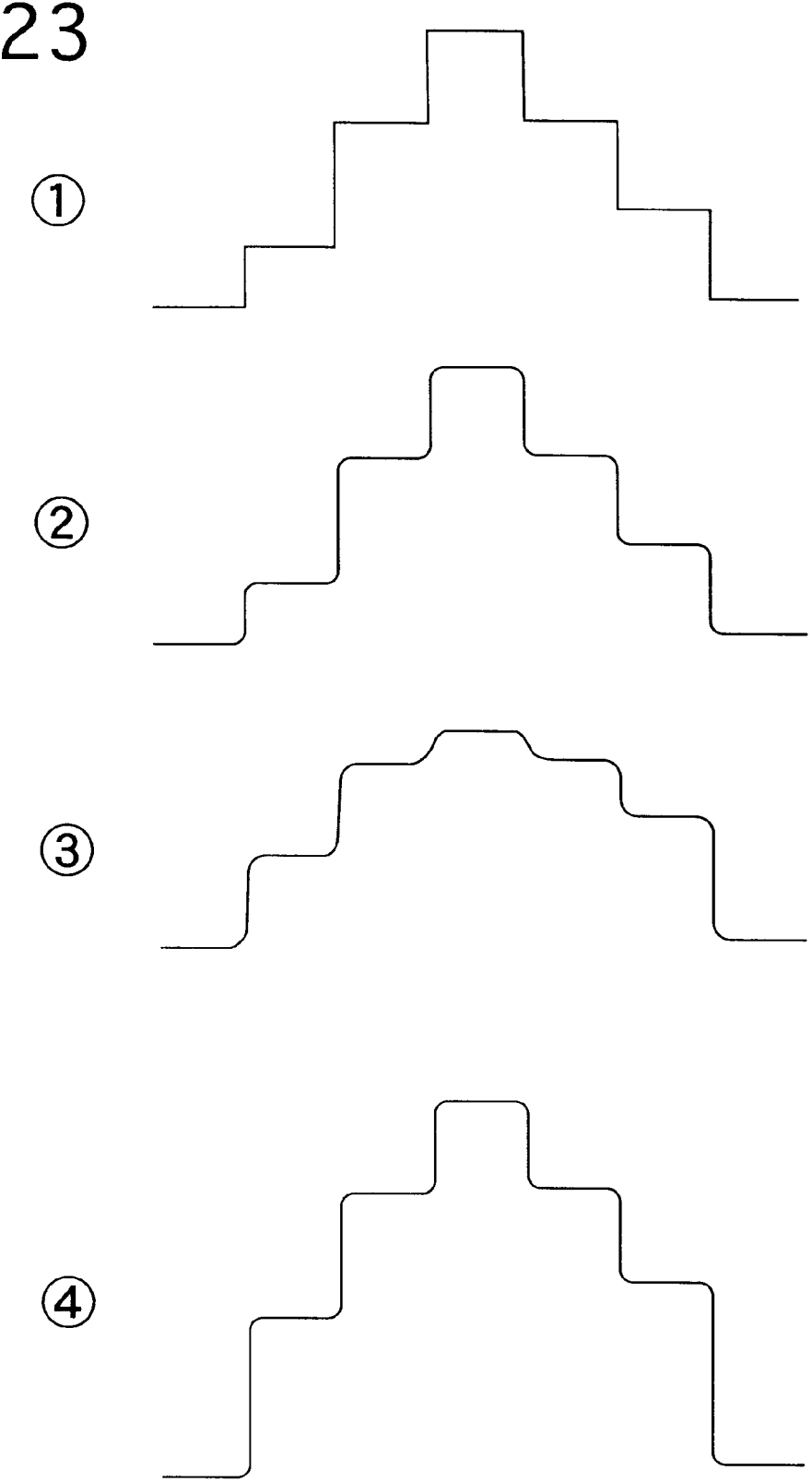
FIG. 23 is a diagram showing a change in a signal wave in a low brightness (dark) area according to another embodiment of the present invention.

FIGS. 22 and 23 show changes in the signal level (FIG. 22) and the wave shape (FIG. 23) in the low brightness area (FIG. 5, 0-B), respectively. If the signal is input, the noise component thereof is eliminated by the low-pass filter 34, so that the signal with a removed noise component is obtained.

In the low brightness area (FIG. 5 0-B), the data for the gamma correction, as well as the original signal are increased. Consequently, if the signal whose wave shape is identical to ② is supplied to the memory 32 for the look-up table, the data for the gamma correction is amplified, so that the wave shape ③ is obtained.

If the original signal and the gamma correcting signal are added, the gamma correcting output signal is obtained. Namely, the noise component is removed from the gamma correction due to the effects of the low-pass filter. Note that it is possible to provide a delay circuit in the transmission line of the original signal to be supplied to the adder 33 to adjust the delay time caused by the low-pass filter 34 and the memory 32, upon adding the original signal to the gamma correcting signal by the adder 33.

Figure 24:
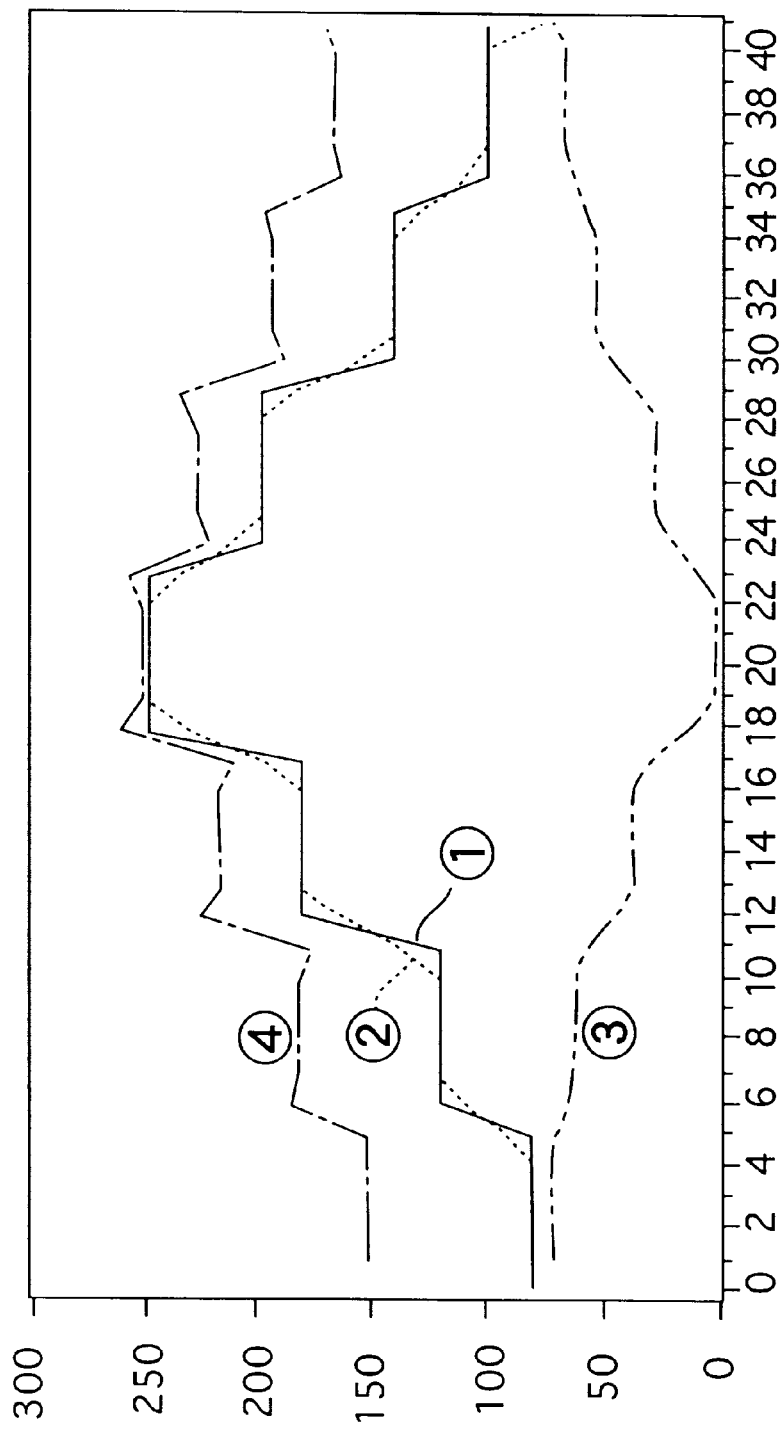
FIG. 24 is a diagram showing a change in a signal level in a high brightness (bright) area according to an embodiment of the present invention.
Figure 25:
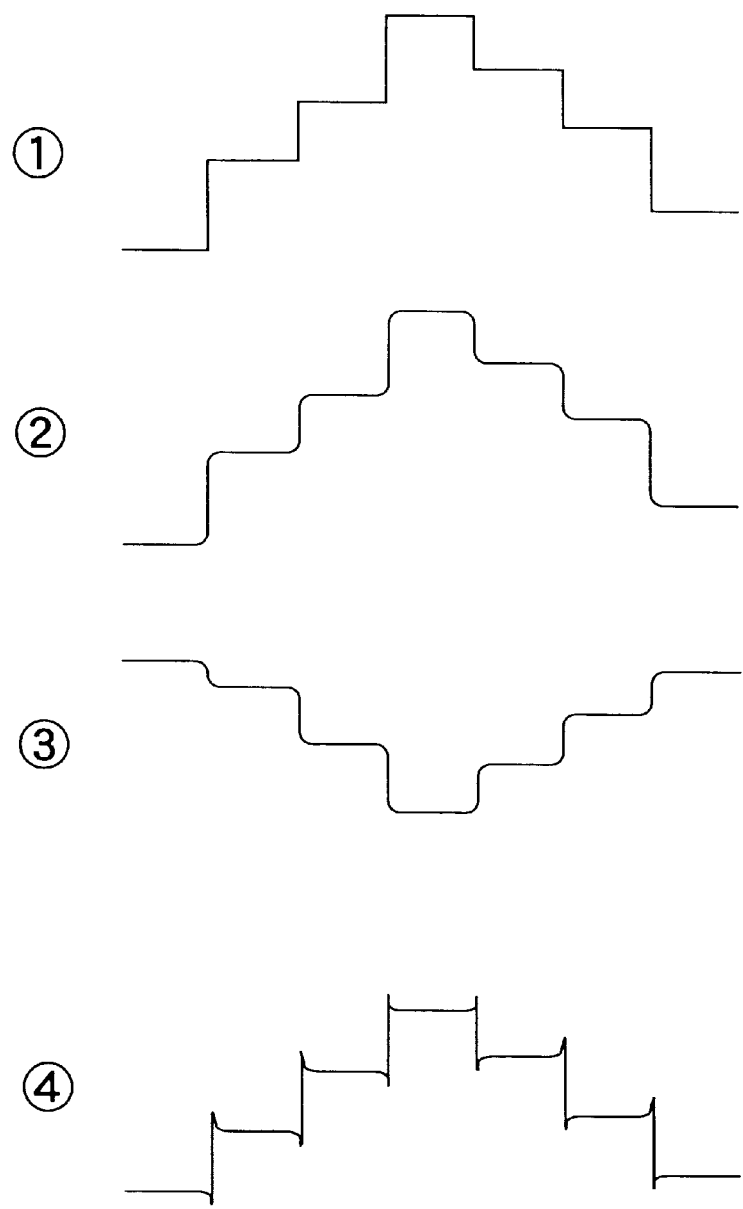
FIG. 25 is a diagram showing a change in a signal wave in a high brightness (bright) area according to another embodiment of the present invention.
Figure 26:
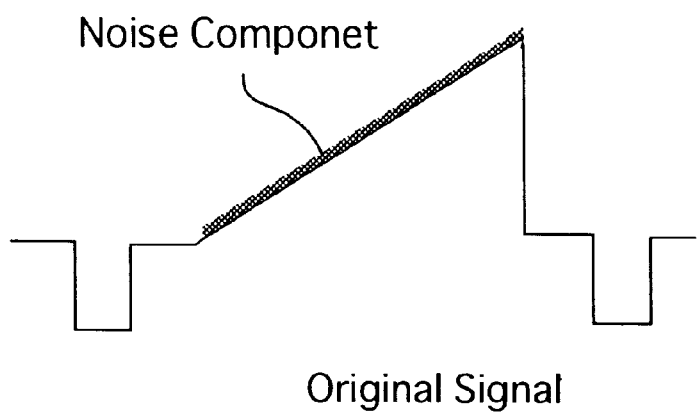
FIGS. 26 and 27 are explanatory diagrams showing the gamma correcting operation.
Figure 27:
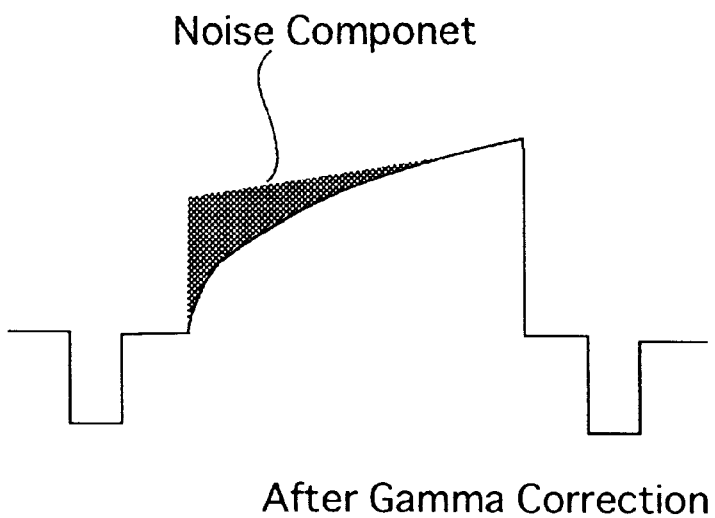

FIGS. 24 and 25 show changes of the signal level (FIG. 24) and the wave shape (FIG. 25) in the high brightness area (FIG. 5 B-D), respectively. If the signal is input, the noise component thereof is eliminated by the low-pass filter 34, so that the signal with a removed noise component is obtained.

In the high brightness area (FIG. 5 B-D), when the original signal is increased, the data for the gamma correction is reduced. Consequently, if the signal whose wave shape is identical to ② is supplied to the memory 32 for the look-up table, the data for the gamma correction output from the memory 32 is reduced as indicated by ③, so that an inverted wave shape is obtained.

If the original signal and the gamma correction signal are added in the adder 33, a gamma correcting output signal is obtained. Namely, an enhancement effect to emphasize the outline is achieved. Note that it is possible to provide a delay circuit in the transmission line of the original signal supplied to the adder 33 to adjust the delay time caused by the low-pass filter 34 and the memory 32.

As can be seen from the foregoing, the noise is reduced or eliminated in the low brightness area and the outline is emphasized in the high brightness area. If various types of gamma correcting data are used selectively, the area for the removal of the noise component and the area for the enhancement are selected as needed.

The present invention is not limited to the illustrated embodiments. For instance, it is possible to connect the gamma correcting circuits 26R, 26G and 26B to the output terminals of the color frame memories 28R, 28G and 28B within the video processor 16 in order to independently carry out the gamma corrections for the tricolor signals. In this alternative, the structure and the operation of the gamma correcting circuits 26R, 26G and 26B are the same as those in the first embodiment.

As can be understood from the above discussion, according to the present invention, since the noise component is removed from the image signal before the supplied to the look-up table from which the gamma correcting data is read, the amplification of the noise component is restricted when the gamma correction of the dark image signal is effected, thereby obtaining a good S/N.

Moreover, since the original signals which do not pass through the low-pass filter are added to the gamma correcting data, no smoothening of the wave shape of the original signal by the low-pass filter occurs, and hence, high quality image signals can be obtained.

Furthermore, the outline of the image signal is emphasized in the bright image area, and accordingly, gamma correction, the elimination of the noise component and the enhancement effect are performed by a single circuit.

Figure 28:
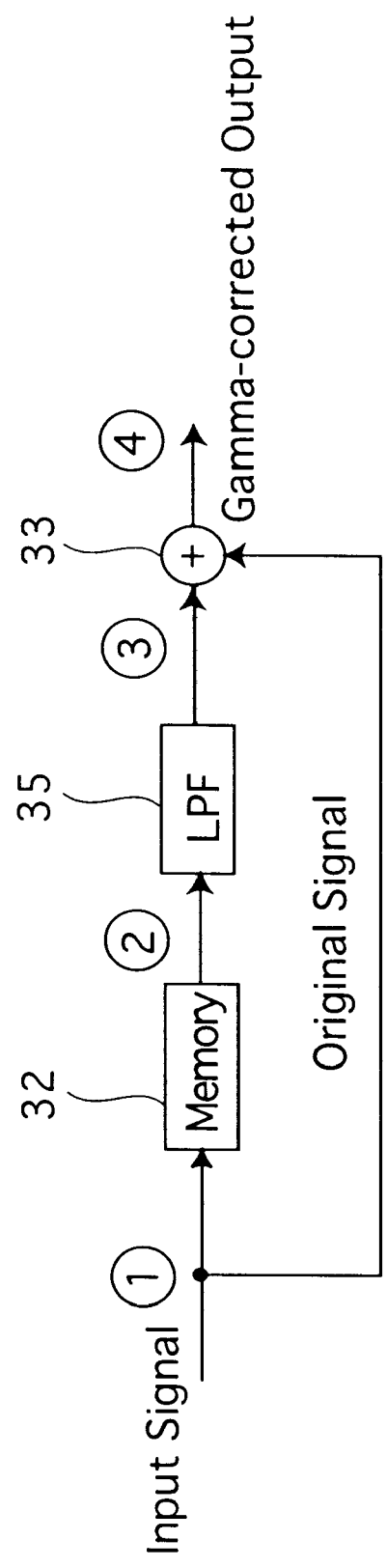
FIG. 28 is a conceptual diagram of a gamma correcting circuit according to an embodiment of the present invention.

FIG. 28 shows another embodiment of the gamma correcting circuit 26 shown in FIG. 3. The gamma correcting circuit 26 is comprised of a read-only memory (ROM) 32 for the look-up table, a low-pass filter 35 adapted to remove a noise component from the output signals of the RCIM 32, and an adder (adder circuit) 33 which adds the output signals of the low-pass filter and the original signals input thereto.

Data stored in the ROM 32 for the look-up table is the same as that shown in FIG. 4 through 7.

The low-pass filter 35 is connected to an image signal output line of the ROM 32 for the look-up table, so that the original signal supplied to the adder 33 does not pass through the low-pass filter 35.

If data processed in the low-pass filter 35 is analog data, digital signals supplied from the ROM 32 for the look-up table are converted to analog signals, and the output (analog) signals of the low-pass filter 35 are converted again to digital signals by an A/D converter and sent to the adder 33.

Figure 29:
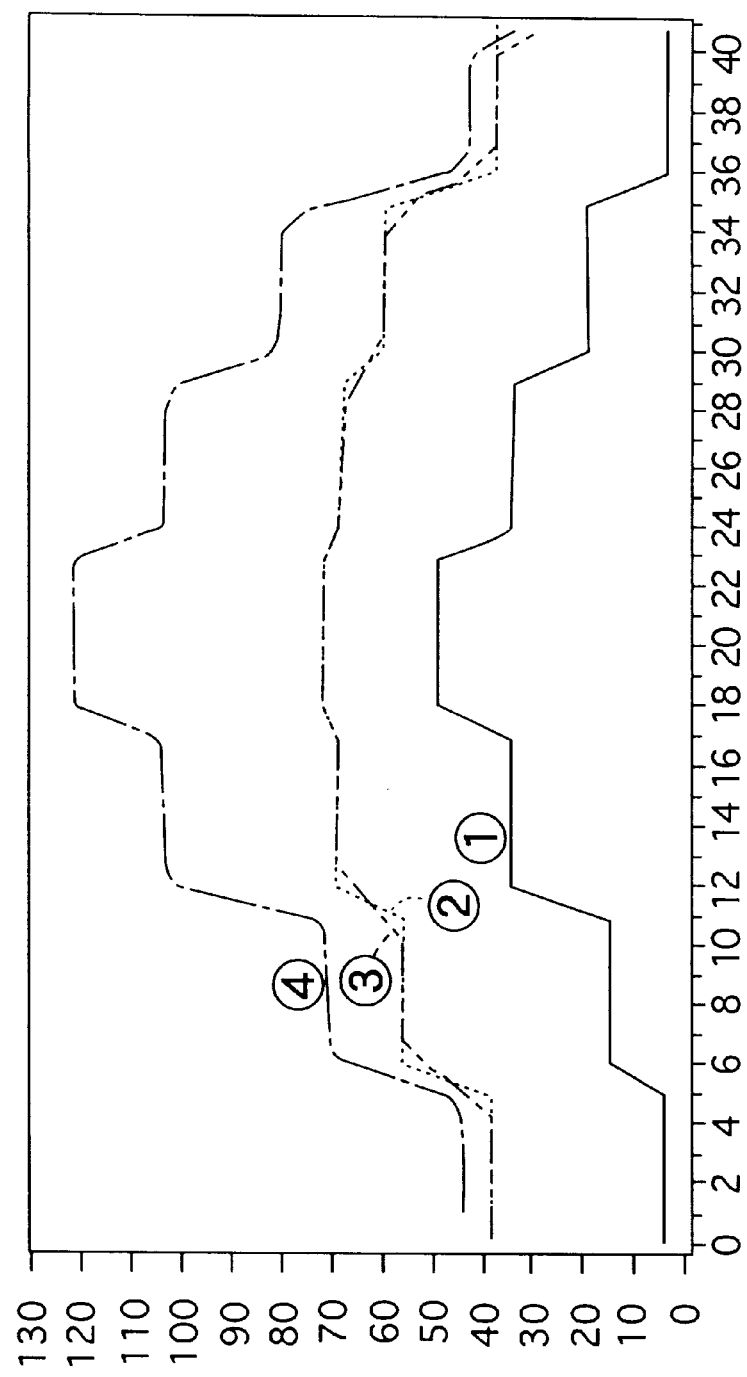
FIG. 29 is a diagram showing a change in a signal level in a low brightness (dark) area according to an embodiment of the present invention.

The above embodiment functions as follows. In FIG. 29, ① designates the original signal before being input to the memory 32 for the look-up table;

② the signal only for the gamma correction, sent to the low-pass filter 35 through the memory 32 for the look-up table;

③ the signal supplied to the adder 33 through the low-pass filter 35; and, ④ the gamma-corrected signal output from the adder 33, respectively.

Figure 30:
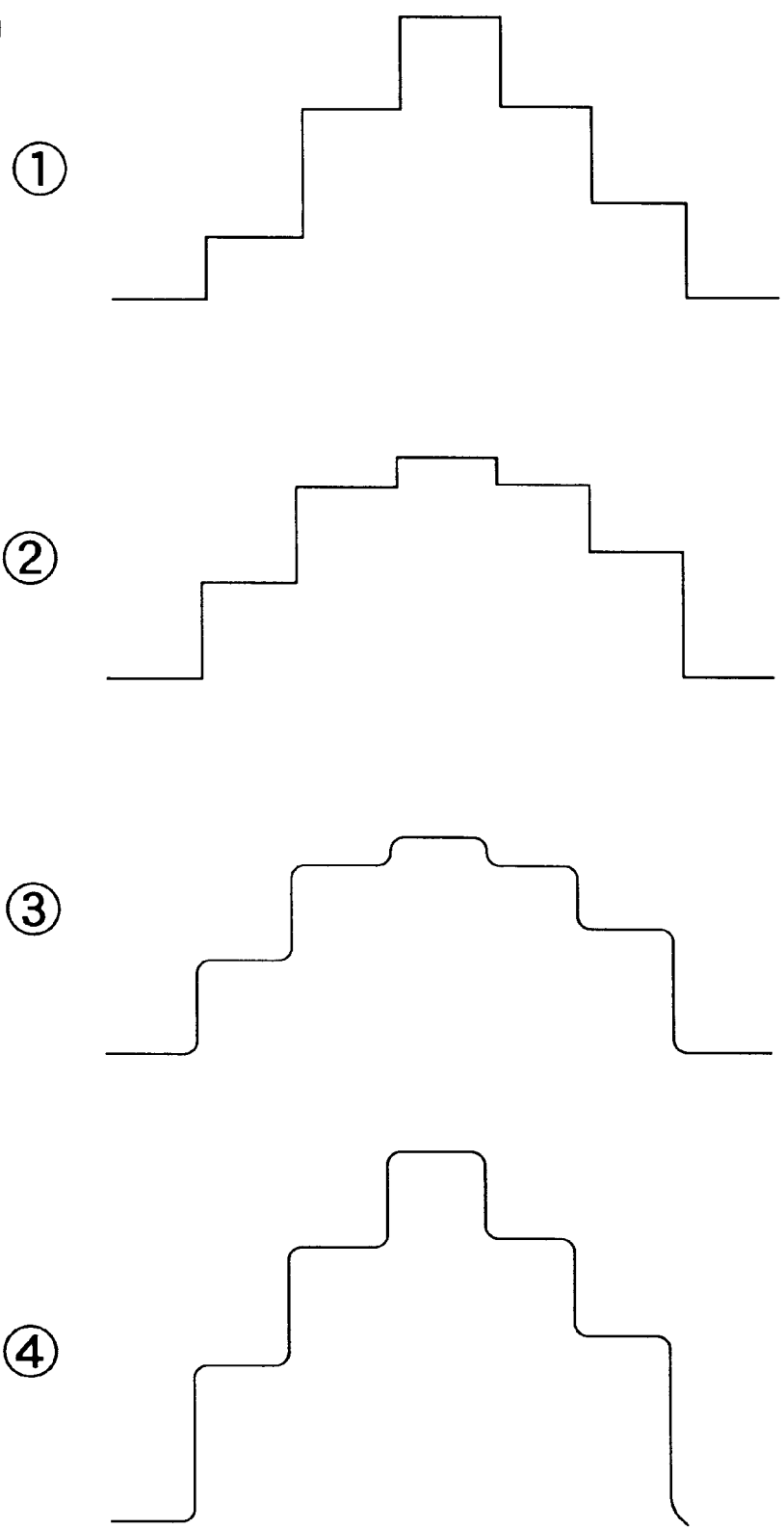
FIG. 30 is a diagram showing a change in a signal wave in a low brightness (dark) area according to an embodiment of the present invention.

FIGS. 29 and 30 show changes of the signal level (FIG. 29) and the wave shape (FIG. 30) in the low brightness area (FIG. 5 0-B), respectively. In the low brightness area (FIG. 5 0-B), the data for the gamma correction increases as the original signal increases. Consequently, if the signal whose wave shape is identical to ① is supplied to the memory 32 for the look-up table, the data for the gamma correction is amplified, so that the wave shape ② is obtained.

Figure 33:
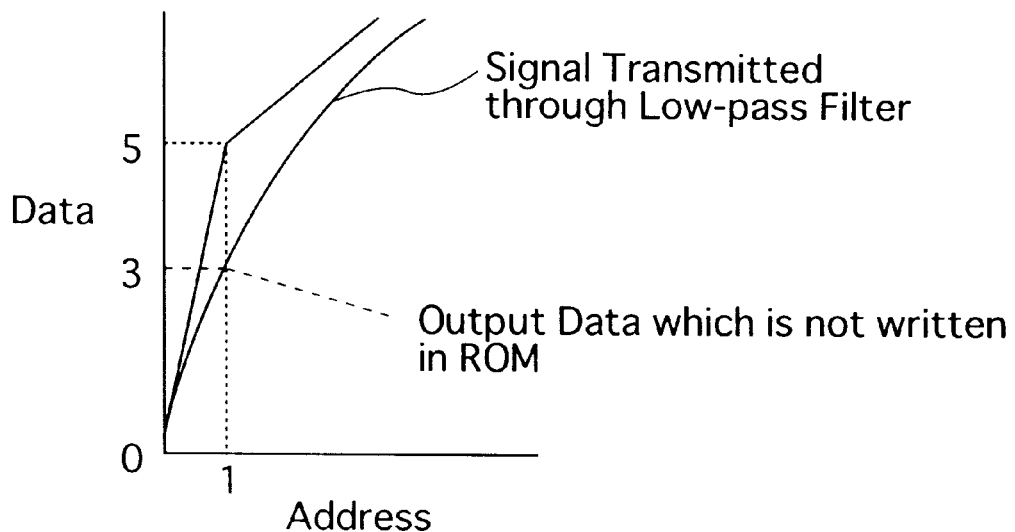
FIGS. 33 and 34 are output diagrams according to an embodiment of the present invention.
Figure 35:
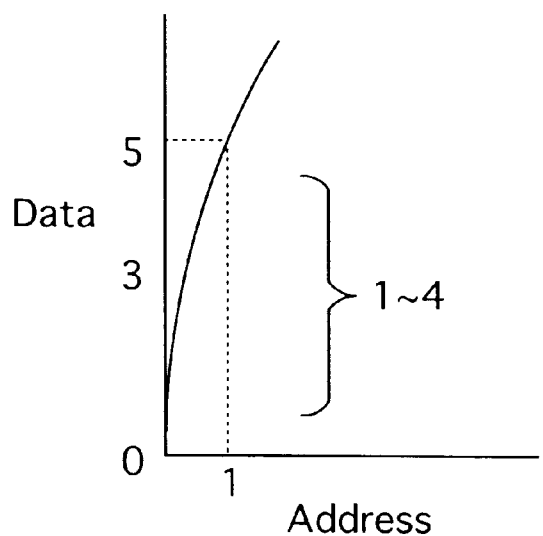
FIG. 35 is an explanatory diagram showing the digital gamma correcting operation.

When the gamma correcting signal output from the memory 32 for the look-up table is transmitted through the low-pass filter 35, the noise component thereof is eliminated or reduced, so that the output signal is obtained. Namely, when the output signals of the memory 32 for the look-up table pass through the low-pass filter 35, data (e.g., data "3" in FIG. 33) which is not written in the memory 32 is obtained as if it is output from the memory 32.

When the gamma correcting data and the original signal are added by the adder 33, the gamma-corrected signal whose noise component has been reduced or eliminated by the low-pass filter is obtained.

Figure 34:
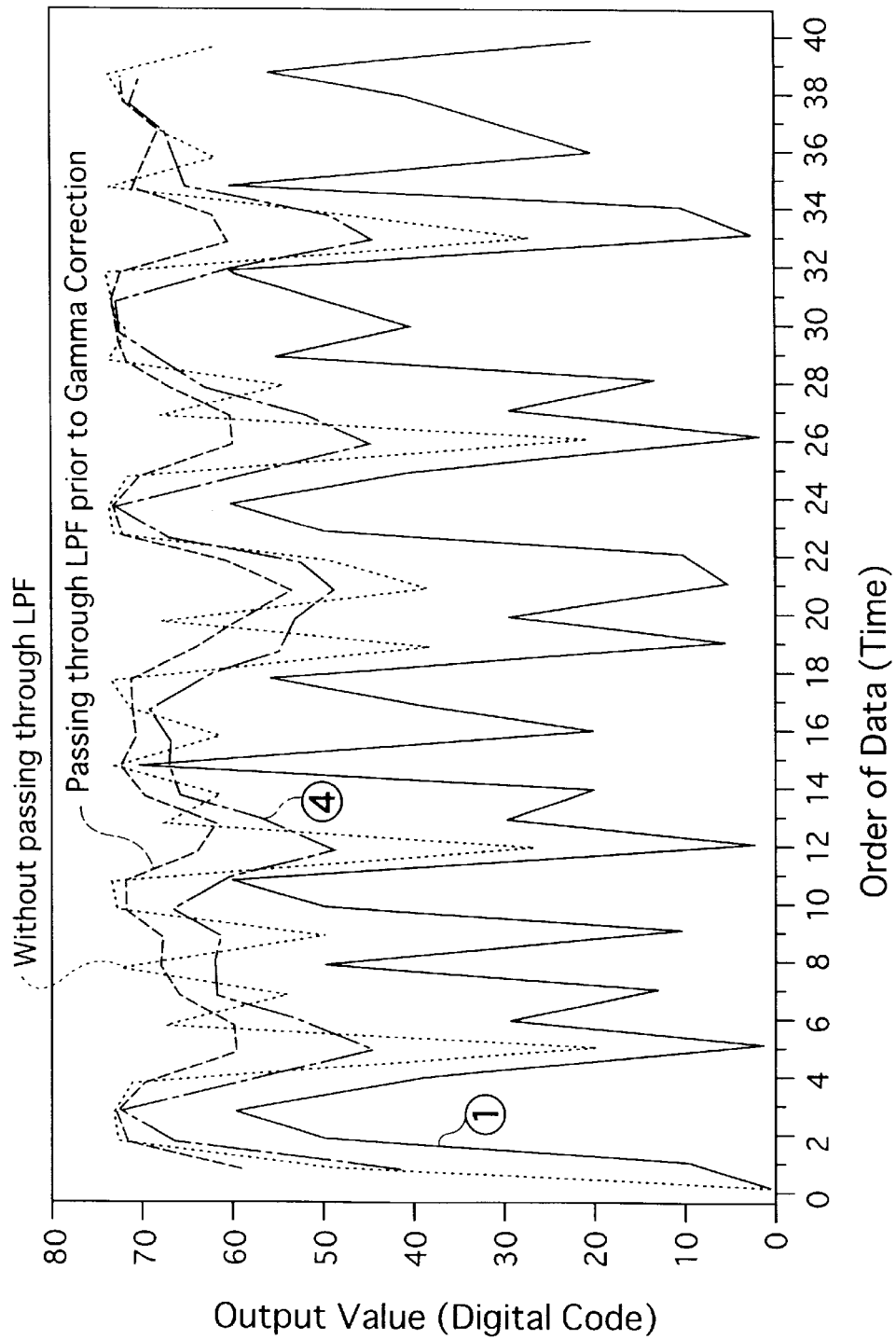

Thus, the low-pass filter, 35 provided in the output signal line of the memory 32 for the look-up table smoothens the signals, as can be seen in FIG. 34 which shows the experimental results for a random noise input to the image signals.

It is possible to include a delay circuit in the transmission line of the original signals supplied to the adder 33 for adjusting the delay time caused by the memory 32 and the low-pass filter 35, upon the adding operation in the adder 33.

Figure 31:
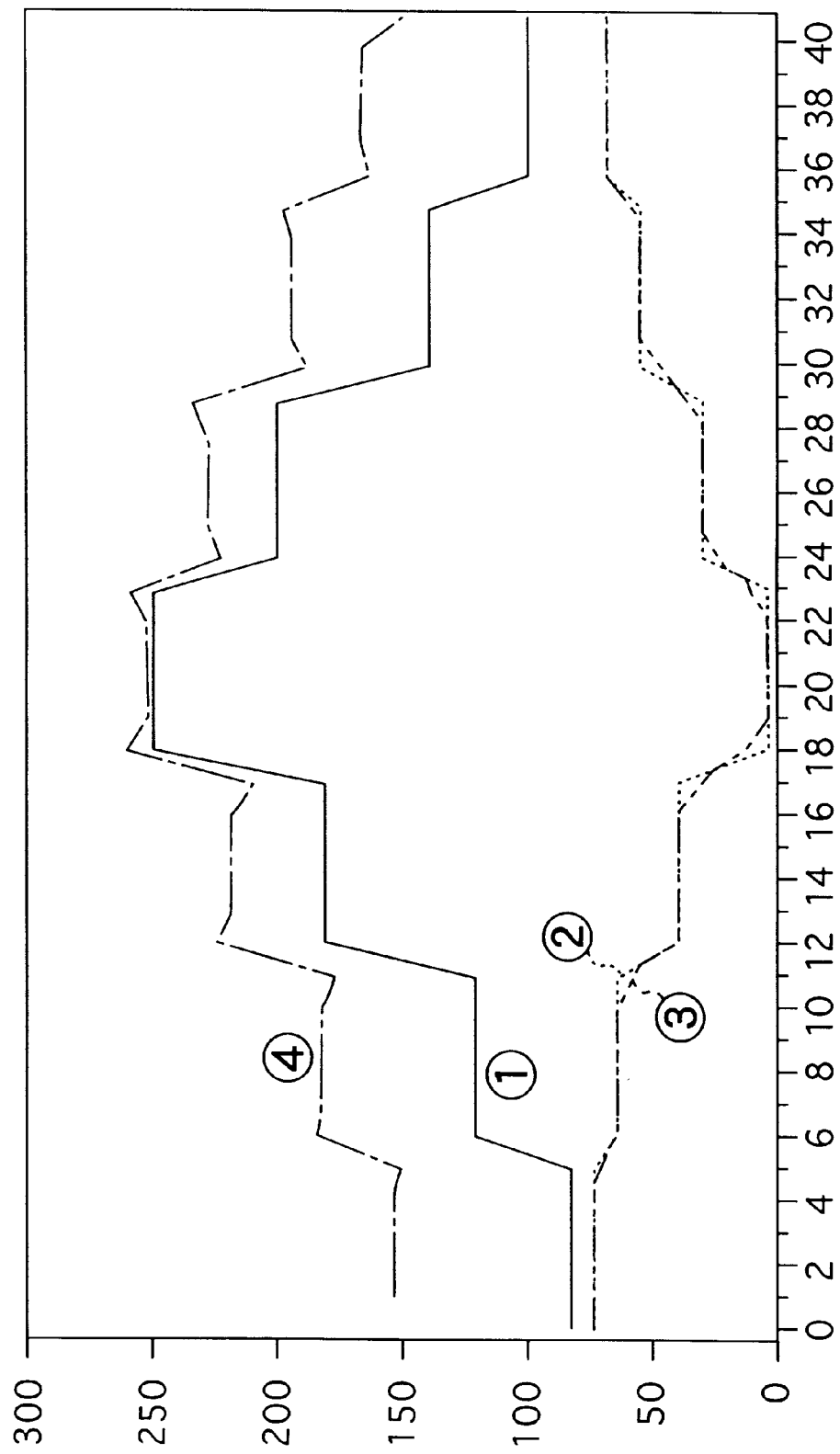
FIG. 31 is a diagram showing a change in a signal level in a high brightness (bright) area according to an embodiment of the present invention.
Figure 32:
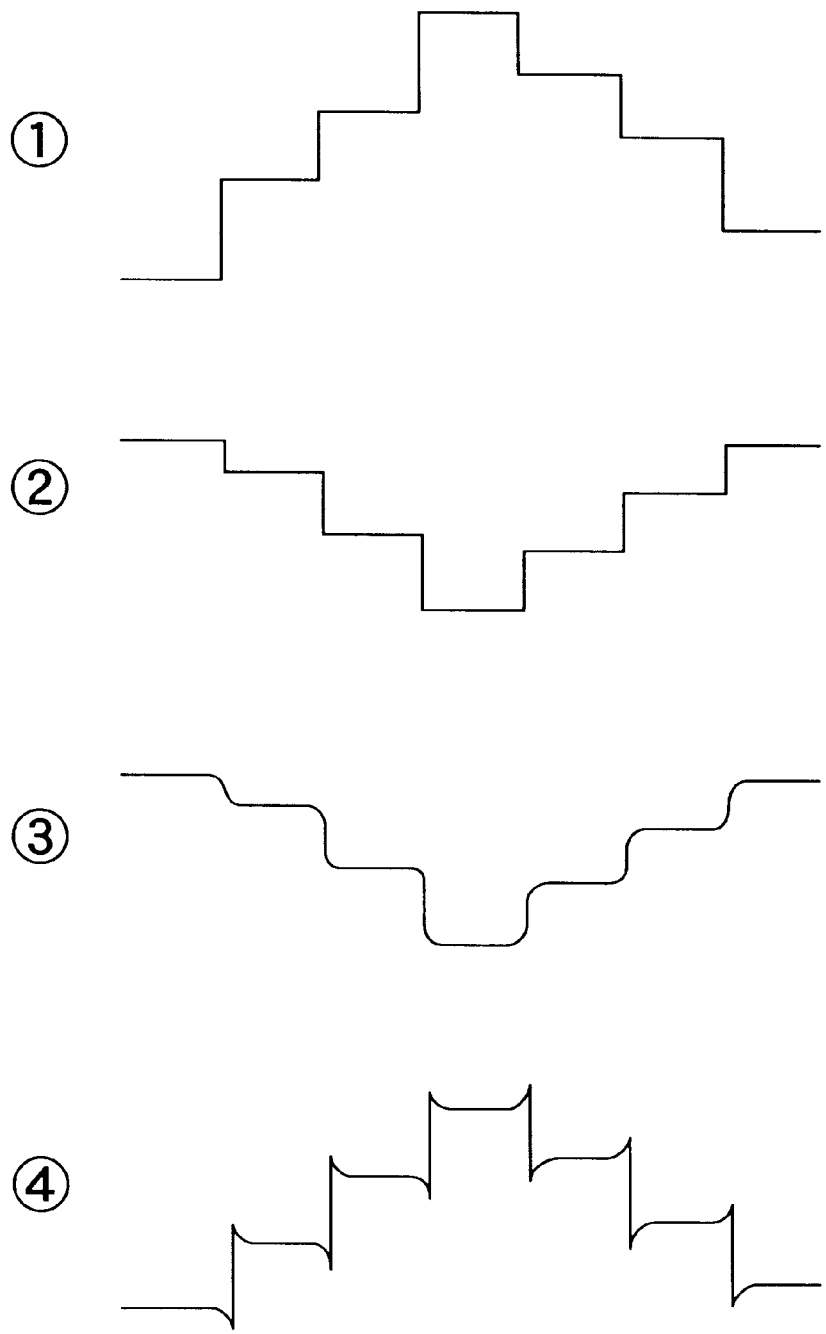
FIG. 32 is a diagram showing a change in a signal wave in a high brightness (bright) area according to an embodiment of the present invention.

FIGS. 31 and 32 show changes of the signal level (FIG. 31) and the wave shape (FIG. 32) in the high brightness area (FIG. 5 B-D), respectively. In the high brightness area (FIG. 5 B-D), when the level of the original signal is increased, the value of gamma correcting data is reduced. Consequently, if the signal whose wave shape is identical to ① is supplied to the memory 32 for the look-up table, the gamma correcting data is reduced as indicated by ②, so that an inverted wave shape is obtained. If the signal is sent to the low-pass filter 35, the noise component thereof is reduced or eliminated by the low-pass filter, so that the signal ③ is obtained.

When the original signal and the gamma correcting signal transmitted through the low-pass filter 35 are added by the adder 33, the gamma-corrected output signal is obtained. Namely, an enhancement effect to emphasize the outline is achieved. Note that it is possible to provide a delay circuit in the transmission line of the original signal supplied to the adder 33 for adjusting the delay time caused by the low-pass filter 35 and the memory 32.

As can be seen from the foregoing, noise is reduced or eliminated in the low brightness area and the outline is emphasized in the high brightness area. If various types of gamma correction data are used selectively, the area for the removal of the noise component and the area for the enhancement are selected as needed.

The present invention is not limited to the illustrated embodiments. For instance, it is possible to connect the gamma correcting circuits 26R, 26G and 26B to the output terminals of the color frame memories 28R, 28G and 28B within the video processor 16 in order to independently carry out the gamma corrections for the tricolor signals. In this alternative, the structure and the operation of the gamma correcting circuits 26R, 26G and 26B are the same as those in the first embodiment.

As can be understood from the above discussion, according to the present invention, since the noise component is reduced or removed from the image signals by the low-pass filter when the image signals are issued from the look-up table from which gamma correcting data is read, the amplification of the noise component is restricted when the gamma correction of the dark image signal is effected, thereby obtaining a good S/N.

Furthermore, since data which is not stored written in the look-up table is output as gamma correcting data, an occurrence of a quantization error during the gamma correction of the digital signals of low level is restricted remarkably.

Moreover, since the original signals which do not pass through the low-pass filter are added to the gamma correcting data, no smoothening of the wave shape of the original signal by the low-pass filter occurs. Hence, high quality image signals are obtained.

Furthermore, since the outline of the image signal is emphasized in the bright image area, gamma correction, the elimination of the noise component and enhancement are performed by one circuit.

FIG. 36 shows still another embodiment of the gamma correcting circuit 26. The gamma correcting circuit 26 is comprised of a read-only memory 32 for the look-up table, a first low-pass filter 34 adapted to remove a noise component from the original signal supplied to the ROM 32, a second low-pass filter 35 adapted to remove a noise component from the output signal of the ROM 32, and an adder (adder circuit) 33 which adds the output signal of the second low-pass filter 35 and the original signal input thereto.

The first low-pass filter 34 is connected to an image signal input line of the ROM 32 for the look-up table, and the second low-pass filter 35 is connected to an image signal output line of the ROM 32, so that the original signal supplied to the adder 33 does not pass through the first low-pass filter 34 or the second low-pass filter 35.

Consequently, the image signals supplied to the ROM 32 have no noise component, but the (original) image signals supplied to the adder 33 are unchanged.

This embodiment functions as follows (see FIGS. 37 through 43).

In FIG. 36, ① designates the original signal before being input to the first low pass filter 34;

② designates the signal transmitted through the first low-pass filter 34 and supplied to the memory 32 for the look-up table, ③ designates the signal for the gamma correction, sent to the second low-pass filter 35 through the memory 32 for the look-up table;

④ designates the signal supplied to the adder 33 through the second low-pass filter 35; and, ⑤ designates the gamma-corrected signal output from the adder 33, respectively.

Figure 37:
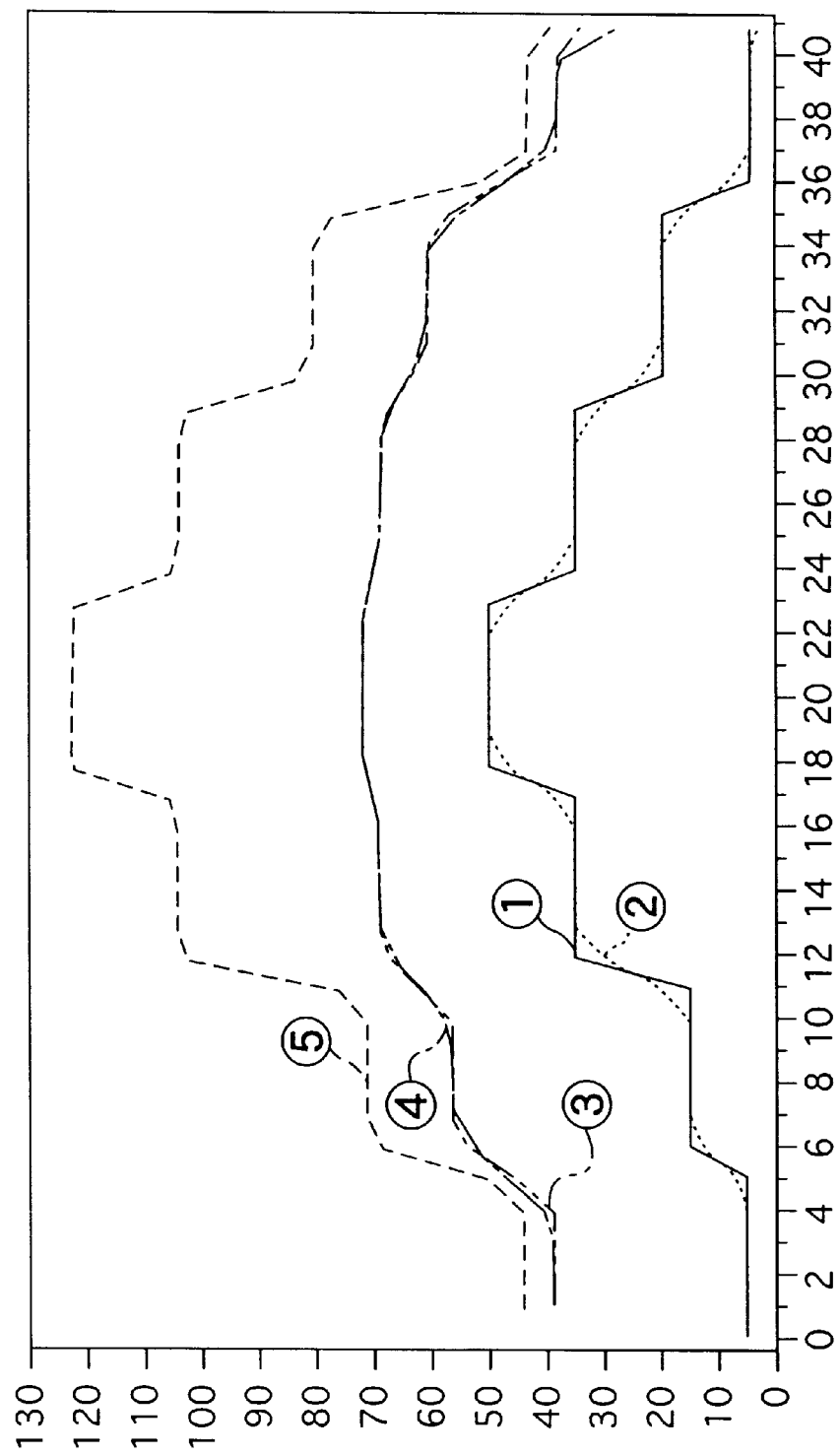
FIG. 37 is a diagram showing a change in a signal level in a low brightness (dark) area according to an embodiment of the present invention.
Figure 38:
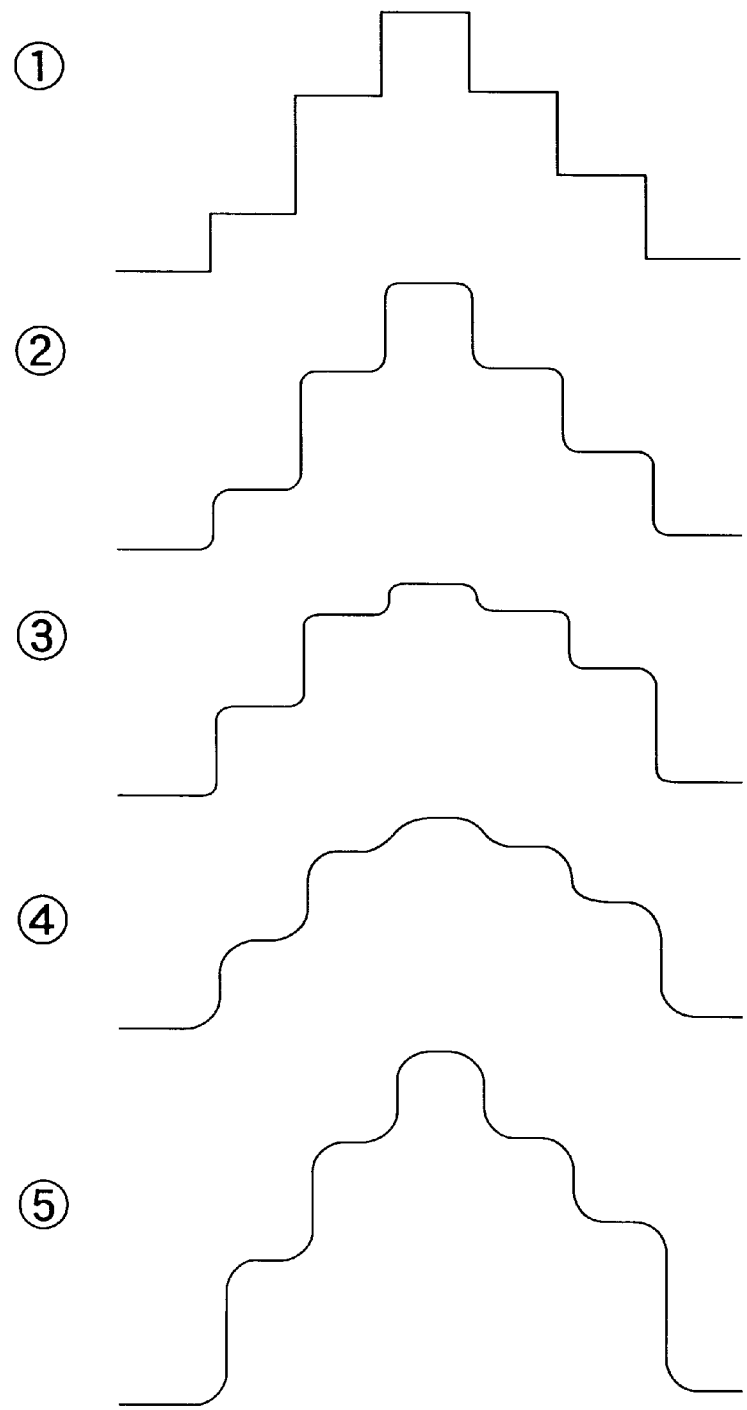
FIG. 38 is a diagram showing a change in a signal wave in a low brightness (dark) area according to an embodiment of the present invention.

FIGS. 37 and 38 show changes of the signal level (FIG. 37) and the wave shape (FIG. 38) in the low brightness area (FIG. 5 0-B), respectively. If the signal whose wave shape is identical to ① is supplied, the signal ② with a reduced noise component is obtained after the signal passes through the first low-pass filter 34.

In the low brightness area (FIG. 5 0-D), the gamma correcting data increases as the level of the original signal increases. Consequently, if the signal whose wave shape is identical to ② is supplied to the ROM 32, the gamma correcting data is amplified, so that the signal ③ is obtained.

When the gamma correcting signal output from the ROM 32 passes through the second low-pass filter 35, the noise contained therein is further reduced, so that the signal ④ is obtained.

Thus, when the gamma correcting signal output from the ROM 32 passes through the second low-pass filter 35, data (e.g., data "3" in FIG. 41) which is not written in the memory 32 is obtained as if it was output from the memory 32.

When the gamma correcting data supplied from the second low-pass filter 35 and the original signal are added by the adder 33, the gamma-corrected signal whose noise component has been reduced by the low-pass filters is obtained.

It can be understood from the foregoing that the first and second low-pass filters 34 and 35, respectively provided before and after the ROM 32 for the look-up table, smoothen the signals more remarkably than the case where a single low-pass filter is provided before or after the ROM 32. This can be seen in FIG. 42, which shows the experimental results for random noise input to the image signals.

It is possible to include a delay circuit in the transmission line of the original signals supplied to the adder 33 to adjust the delay time caused by the ROM 32 and the first and second low-pass filters 34 and 35, respectively upon the adding operation in the adder 33.

Figure 39:
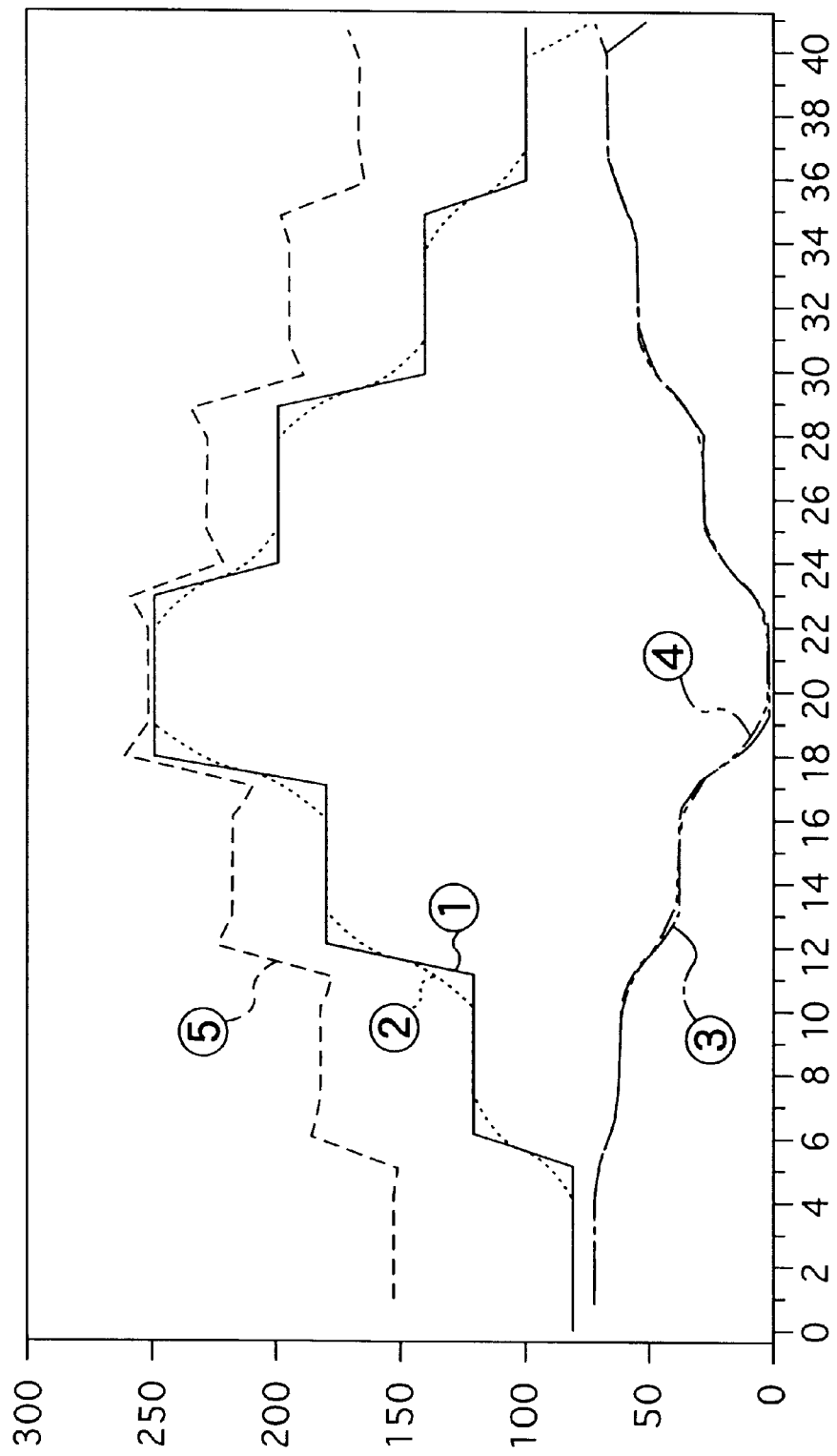
FIG. 39 is a diagram showing a change in a signal level in a high brightness (bright) area according to an embodiment of the present invention.
Figure 40:
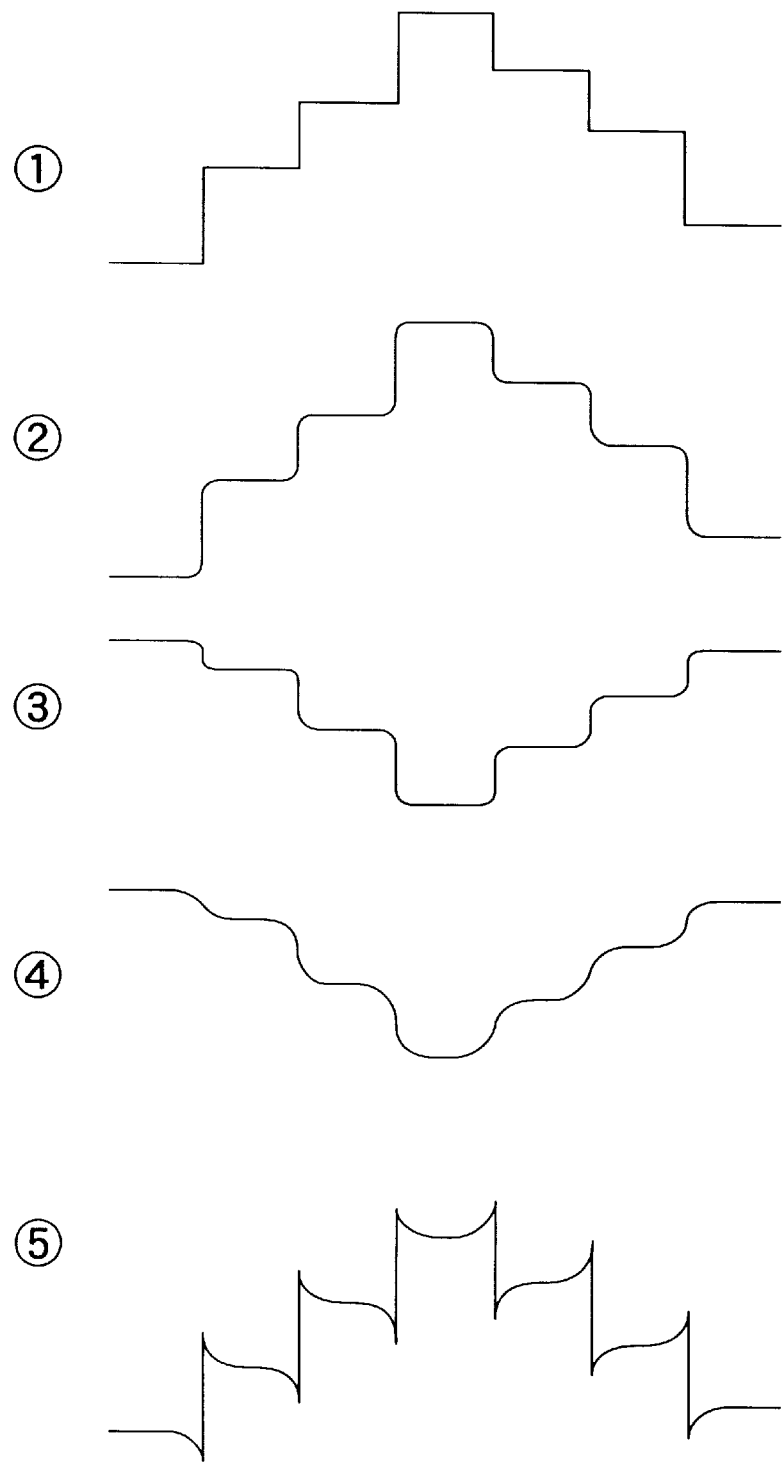
FIG. 40 is a diagram showing a change in a signal wave in a high brightness (bright) area according to an embodiment of the present invention; and, FIGS. 41, 42 and 43 are output diagrams according to an embodiment of the present invention.
Figure 41:
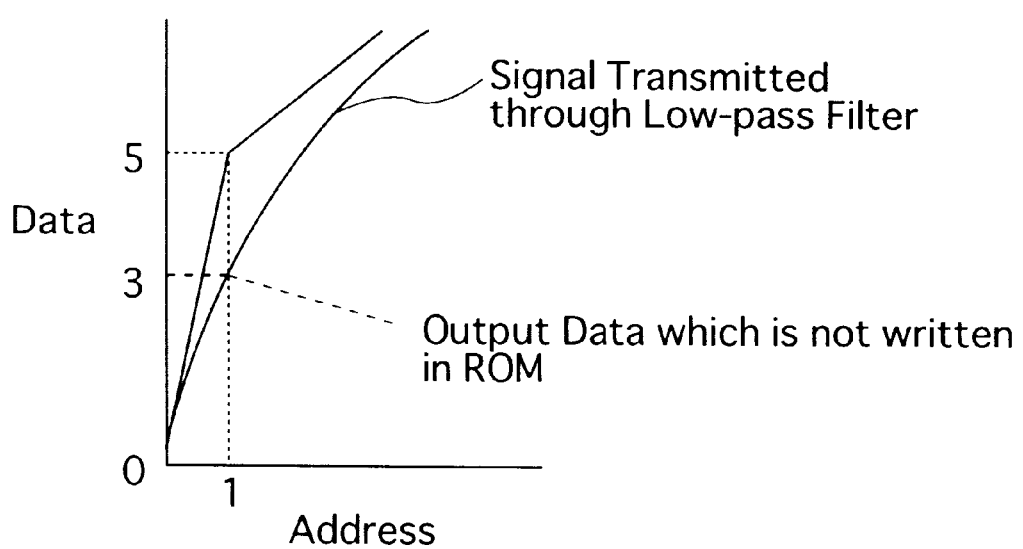
Figure 42:
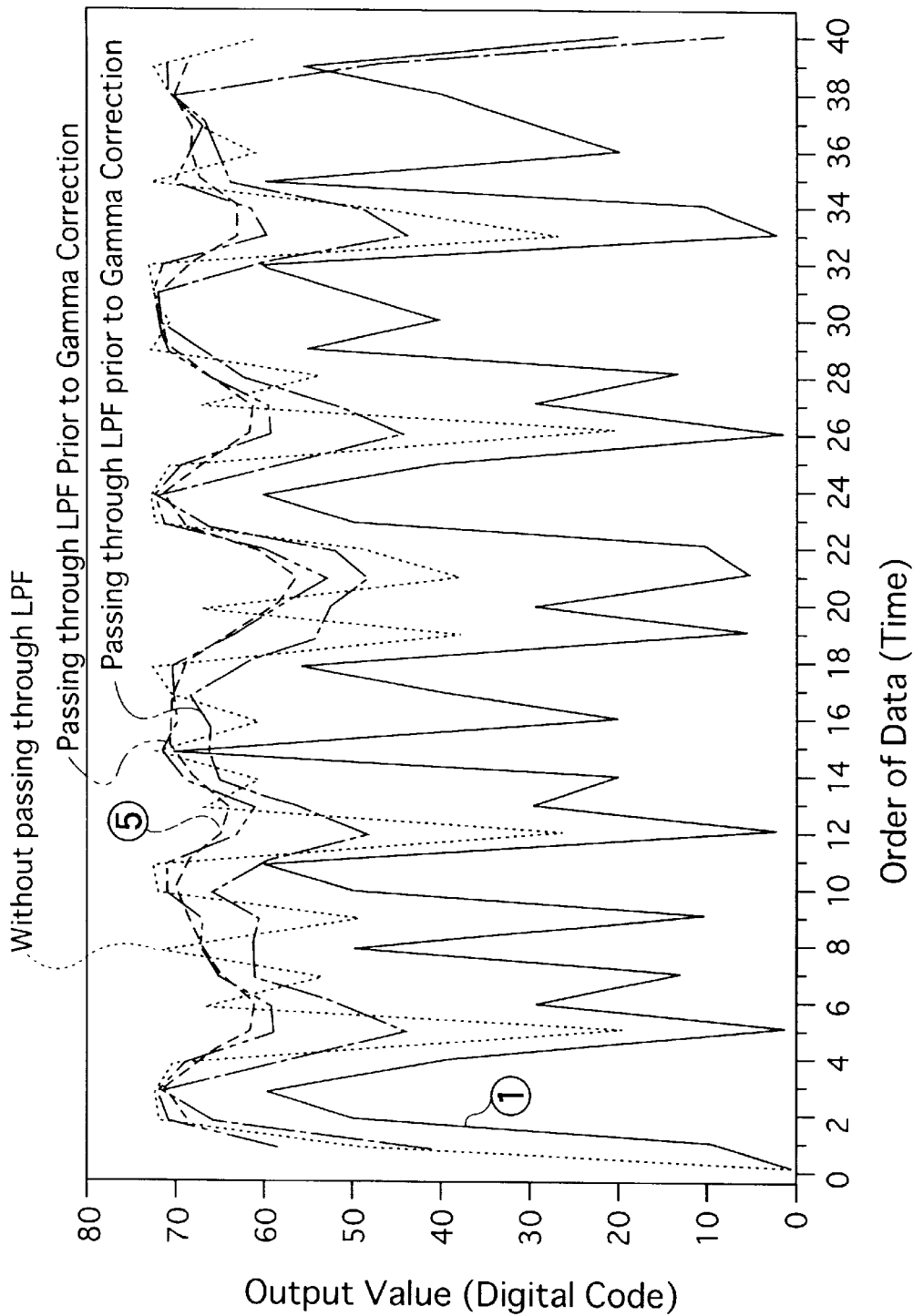

FIGS. 39 and 40 show changes of the signal level (FIG. 39) and the wave shape (FIG. 40) in the high brightness area (FIG. 5 B-D), respectively. If the signal whose wave shape is identical ① to is supplied, the noise component is reduced as indicated in ② when the signal passes through the first low-pass filter 34.

In the high brightness area (FIG. 5 B-D), when the level of the original signal is increased, the gamma correcting data is reduced. Consequently, if the signal whose wave shape is identical to ② to is supplied to the memory 32 for the look-up table, the gamma correcting data is reduced as indicated by ③, so that an inverted wave shape is obtained. If the signal is sent to the second low-pass filter 35, the noise component thereof is further reduced thereby, as indicated by ④.

When the original signal and the gamma correction signal transmitted through the second low-pass filter 35 are added in the adder 33, the gamma-corrected output signal is obtained. Namely, an enhancement effect to emphasize the outline is achieved.

Figure 43:
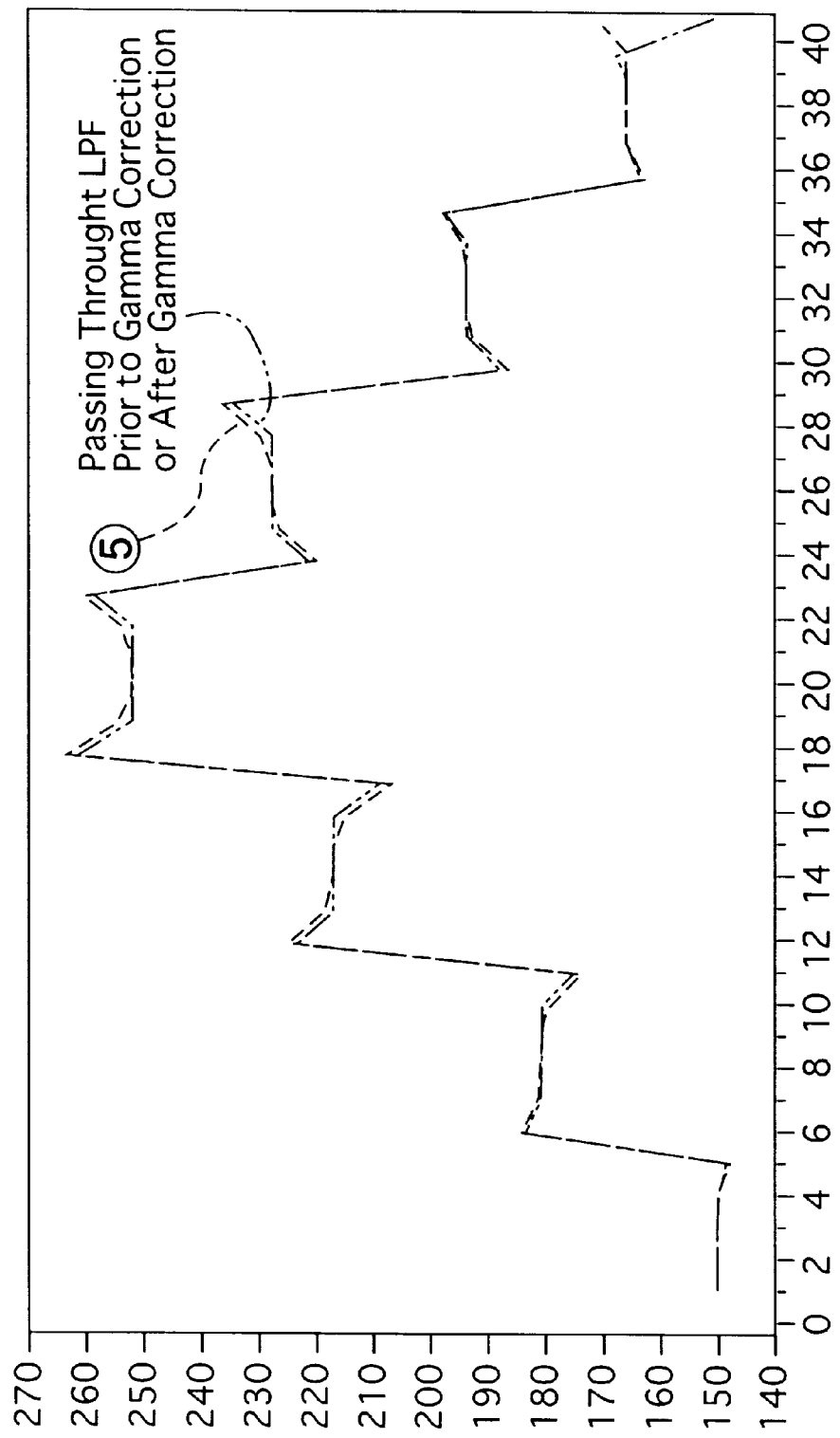

The first and second low-pass filters 34 and 35 respectively, provided before and after the ROM 32 for the look-up table can emphasize the outline of the image signals more clearly than the case where a single low-pass filter is provided before or after the ROM 32, as can be seen in FIG. 43.

Note that it is possible to provide a delay circuit in the transmission line of the original signal to be supplied to the adder 33 for adjusting the delay time caused by the first and second low-pass filters 34 and 35 respectively, and the ROM 32.

As can be seen from the foregoing, the noise is reduced or eliminated in the low brightness area and the outline is emphasized in the high brightness area. If various gamma correcting data are selectively used, the area for the removal of the noise component and the area for the enhancement can be selected as needed.

The present invention is not limited to the illustrated embodiments. For instance, it is possible to connect the gamma correcting circuits 26R, 26G and 26B to the output terminals of the color frame memories 28R, 28G and 28B within the video processor 16 to independently carry out the gamma corrections for the tricolor signals, as shown in FIG. 8. In this alternative, the structure and the operation of the gamma correcting circuits 26R, 26G and 26B are the same as those in the first embodiment.

As can be understood from the above discussion, according to the present invention, since the noise component is reduced or removed from the image signals by the first and second low-pass filters before or after the image signals are supplied to or from the ROM 32 for the look-up table from which gamma correcting data is read, the amplification of the noise component is restricted when the gamma correction of the dark image signal is effected, thereby obtaining a good S/N.

In the above embodiments the CCD is provided on the front end of the insertion portion of the endoscope but is not limited to this structure and can be provided on outer end of the endoscope.

Furthermore, since data which is not stored in the look-up table is output as gamma correcting data, an occurrence of a quantization error during the gamma correction of the digital signals of low level are restricted remarkably.

Moreover, since the original signals do not pass through the low-pass filters, no smoothening of the wave shape of the original signal by the low-pass filters occurs, and thereby, high quality image signals can be obtained.

Furthermore, the outline of the image signal is emphasized in the bright image area, and accordingly, the gamma correction, the elimination of the noise component and the enhancement can be performed by one circuit.

We claim:

1. An electronic endoscope having a solid state image pickup device supplying an image signal that is transmitted through a data line, said endoscope comprising:
   a branch that branches the data line of the image signal into first and second data lines;
   a look-up table that stores only a plurality of gamma correction data corresponding to image signals, the look-up table being connected with the first data line, the gamma correction data representing a difference between a gamma-corrected value and an image signal;
   an issuing system that issues, from said look-up table, one of the plurality of gamma correction data corresponding to said image signal transmitted from said image pickup device through the first data line; and
   a gamma correction system that adds said image signal transmitted through the second data line and said issued gamma correction data to output a gamma-corrected image signal.

2. An electronic endoscope according to claim 1, wherein said image signal comprises red, green, and blue color signals output independently from said solid state image pickup device.

3. An electronic endoscope according to claim 2, further comprising an A/D converter for converting said image signal to a digital image signal.

4. An electronic endoscope according to claim 2, wherein said gamma correction system includes an adder which adds said gamma correction data issued by the issuing system to said image signal transmitted from the second data line and outputs the gamma-corrected image signal.

5. An electronic endoscope according to claim 3, wherein said gamma correction data corresponds to a level of said digital image signal.

6. An electronic endoscope according to claim 3, said gamma correction system comprising first, second and third gamma correction system for independently carrying out gamma corrections of said red, green and blue color signals after said image signal is converted by said A/D converter to said digital image signal.

7. An electronic endoscope according to claim 6, further comprising frame memories which store red, green and blue color digital signals output from said first, second and third gamma correction system, respectively.

8. An electronic endoscope according to claim 3, further comprising frame memories which store red, green, and blue color digital signals output from said A/D converter, respectively.

9. An electronic endoscope according to claim 8, said gamma correction system includes first, second and third gamma correction system for independently carrying out gamma correction of said red, green and blue color signals after said digital image signal is read from said frame memories.

10. An electronic endoscope according to claim 1, wherein a plurality of types of gamma correction data are stored in a single memory and wherein said endoscope further comprises a gamma characteristic selecting means for selecting said one of said types gamma correction data.

11. An electronic endoscope according to claim 7, further comprising indicating means for indicating said gamma correction data.

12. An electronic endoscope according to claim 1, wherein said solid state image pickup device is provided at a front end of an insertion portion of said endoscope.

13. An electronic endoscope according to claim 1, further comprising a low-pass filter which eliminates a noise component from said image signal input to said look-up table.

14. An electronic endoscope according to claim 13, wherein said image signal to which said data for gamma correction is to be added does not pass through said low-pass filter.

15. An electronic endoscope according to claim 1, further comprising a low-pass filter which eliminates a noise component from said gamma correction data read from said look-up table.

16. An electronic endoscope according to claim 1, further comprising a first low-pass filter which eliminates a noise component from said image signal input to said look-up table, and a second low-pass filter which eliminates a noise component from said gamma correction data read from said look-up table.

17. An electronic endoscope according to claim 16, wherein said image signal to which said gamma correcting data is to be added does not pass through said first low-pass filter or said second low-pass filter.

18. The electronic endoscope having a solid state image pickup device supplying an image signal according to claim 1, said image signal, to which said gamma correction data is added by said gamma correction system, bypassing said look-up table.

19. The electronic endoscope having a solid state image pickup device according to claim 1, said gamma correction system adding said gamma correction data to an image signal not passing through said look-up table.

20. An electronic endoscope comprising:
a solid state image pickup device supplying an image signal through a data line which is converted to a digital image signal and subject to gamma correction in accordance with gamma correction data stored in, and read from, a look-up table, wherein said look-up table stores only a plurality of gamma correction data representing a difference between a gamma-corrected digital signal and a digital image signal, so that said gamma correction data output from the look-up table is added to said digital image signal to provide a gamma-corrected digital signal, wherein the data line branches into first and second data lines and the digital image signal in the first data line is used to determine the gamma correction data, and the digital image signal in the second data line is added to the gamma correction data output from the look-up table to obtain the gamma corrected digital signal.

21. An electronic endoscope according to claim 20, wherein said solid state image pickup device is provided at a front end of an insertion portion of said endoscope.

22. The electronic endoscope according to claim 20, said gamma correction data output from said look-up table being added to said image signal not transmitted through said look-up table.

23. The electronic endoscope according to claim 20, said image signal serving as an address signal for said look-up table.

24. An electronic endoscope comprising:
a solid state image pickup device which supplies an image signal which is converted in accordance with gamma correction data stored in and read from a look-up table, wherein said look-up table exclusively stores a plurality of gamma correction data representing a difference between a gamma-corrected signal and an image signal, and a low-pass filter which eliminates a noise component from said image signal input to said look-up table, so that said gamma correction data for said gamma correction output from said look-up table is added to said image signal to output a gamma-corrected signal, wherein the image signal from the image pickup device is split into identical first and second signals, the first signal passing through the low-pass filter to the look-up table and the second signal not passing through the filter, the second signal having the gamma correction data output from the look-up table added thereto.

25. An electronic endoscope according to claim 24, which said solid state image pickup device is provided at a front end of an insertion portion of said endoscope.

26. The electronic endoscope according to claim 24, said image signal input to said look-up table serving as an address signal for said look-up table.

27. An electronic endoscope comprising:
a solid state image pickup device which supplies an image signal which is converted to a digital image signal and is subject to a gamma correction in accordance with gamma correction data stored exclusively in and read from a look-up table, wherein the gamma correction data represents a difference between a gamma-corrected image signal and an image signal before the gamma correction, and a low-pass filter which removes a noise component from the gamma correction data output from said look-up table, so that said gamma correction data, read from said look-up table and transmitted through said low-pass filter is added to said image signal to output a gamma-corrected signal, wherein the image signal from the image pickup device is split into identical first and second signals, the first signal being connected to the look-up table and the second signal having the gamma correction data output from the look-up table added thereto.

28. An electronic endoscope according to claim 27, wherein said solid state image pickup device is provided at a front end of an insertion portion of said endoscope.

29. The electronic endoscope according to claim 27, said image signal input to said look-up table serving as an address signal for said look-up table.

30. An electronic endoscope comprising:
a solid state image pickup device which supplies an image signal which is converted to a digital signal and is subject to gamma correction in accordance with gamma correction data stored exclusively in, and read from, a look-up table, wherein the gamma correction data represents a difference between a gamma-corrected signal and an image signal before gamma correction, a first low-pass filter which removes a noise component from said digital signal input to said look-up table, and a second low-pass filter which removes a noise component from the gamma correction data output from said look-up table, so that said gamma correction data read from said look-up table and transmitted through said second low-pass filter, is added to said digital signal to output a gamma-corrected signal, wherein the signal from the image pickup device is split into identical first and second signals, the first signal being connected to the look-up table and the second signal having the gamma correction data added thereto.

31. The electronic endoscope according to claim 30, said digital signal input to said look-up table serving as an address signal for gamma correction data stored in said look-up table.

\* \* \* \* \*